(12) United States Patent
Tobari et al.

(10) Patent No.: US 8,410,735 B2
(45) Date of Patent: Apr. 2, 2013

(54) TORQUE RIPPLE SUPPRESSION CONTROL DEVICE FOR PERMANENT MAGNET MOTOR AND ELECTRIC POWER STEERING SYSTEM

(75) Inventors: Kazuaki Tobari, Hitachiota (JP); Yoshitaka Iwaji, Hitachinaka (JP); Junnosuke Nakatsugawa, Hitachi (JP); Rikio Yoshikawa, Numazu (JP); Masamichi Yagai, Mito (JP)

(73) Assignee: Kokusan Denki Co., Ltd., Shizuoka (JP)

( * ) Notice: Subject to any disclaimer, the term of this patent is extended or adjusted under 35 U.S.C. 154(b) by 251 days.

(21) Appl. No.: 13/009,007

(22) Filed: Jan. 19, 2011

(65) Prior Publication Data

US 2011/0175556 A1    Jul. 21, 2011

(30) Foreign Application Priority Data

Jan. 19, 2010    (JP) ................................. 2010-009044

(51) Int. Cl.
*H02P 21/00*    (2006.01)

(52) U.S. Cl. .................... 318/400.02; 318/432; 318/809; 318/719; 318/400.32; 318/632; 180/444; 180/446; 701/41; 701/43

(58) Field of Classification Search .................. 318/432, 318/632, 434, 809, 811, 802, 719, 718, 801, 318/139, 807, 727, 400.02, 400.32; 180/444, 180/446; 701/41, 43
See application file for complete search history.

(56) References Cited

U.S. PATENT DOCUMENTS

| 6,081,087 A * | 6/2000 | Iijima et al. ............... 318/400.13 |
| 6,859,001 B2 * | 2/2005 | Kane et al. ................ 318/400.23 |
| 7,808,202 B2 * | 10/2010 | Tobari et al. .................. 318/801 |
| 7,952,308 B2 * | 5/2011 | Schulz et al. ............ 318/400.23 |
| 8,285,451 B2 * | 10/2012 | Ta et al. ........................... 701/41 |

FOREIGN PATENT DOCUMENTS

| JP | 2004120841 A * | 4/2004 |
| JP | 2004-201487 | 7/2004 |
| JP | 2010057217 A * | 3/2010 |

* cited by examiner

*Primary Examiner* — Walter Benson
*Assistant Examiner* — Jorge Carrasquillo
(74) *Attorney, Agent, or Firm* — Antonelli, Terry, Stout & Kraus, LLP.

(57) ABSTRACT

A torque ripple suppression control device for a permanent magnet motor includes a current command conversion unit that outputs a current command value, a position detector that detects a rotational position of the permanent magnet motor, a current detection unit that detects a current at the permanent magnet motor, an induced voltage coefficient setting unit that outputs an information signal related to an induced voltage coefficient for an induced voltage at the permanent magnet motor, a torque ripple suppression operation unit that outputs a current correction command value for the permanent magnet motor, a current control operation unit that outputs a voltage command value based upon addition results obtained by adding together the current command value and the current correction command value and the current detection value, and a power converter that outputs a voltage with which the permanent magnet motor is to be driven.

17 Claims, 19 Drawing Sheets

FIG. 8
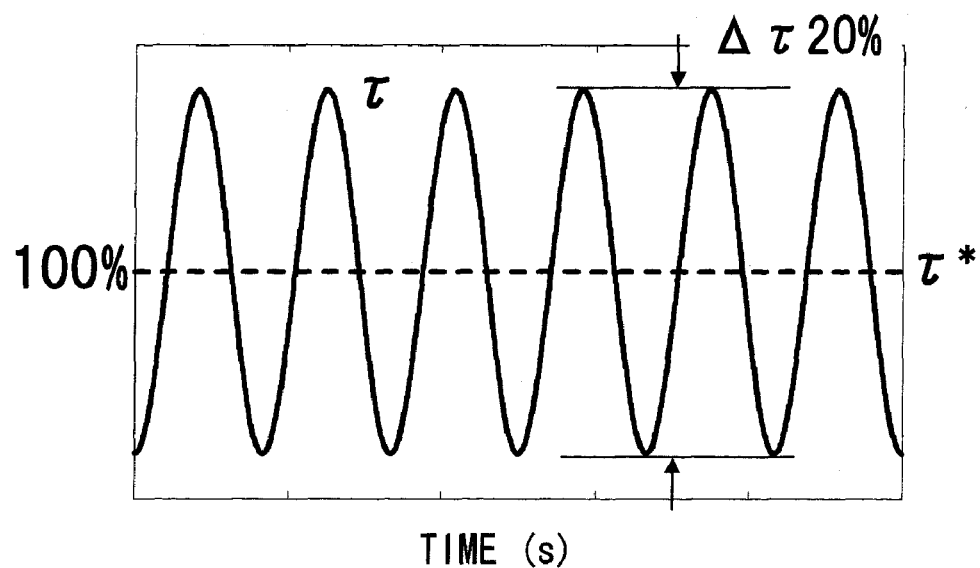
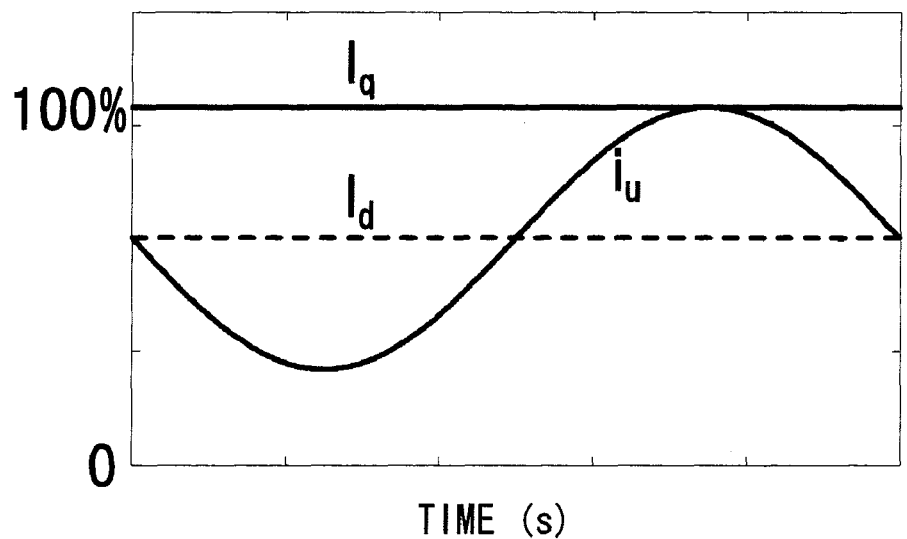

FIG. 9
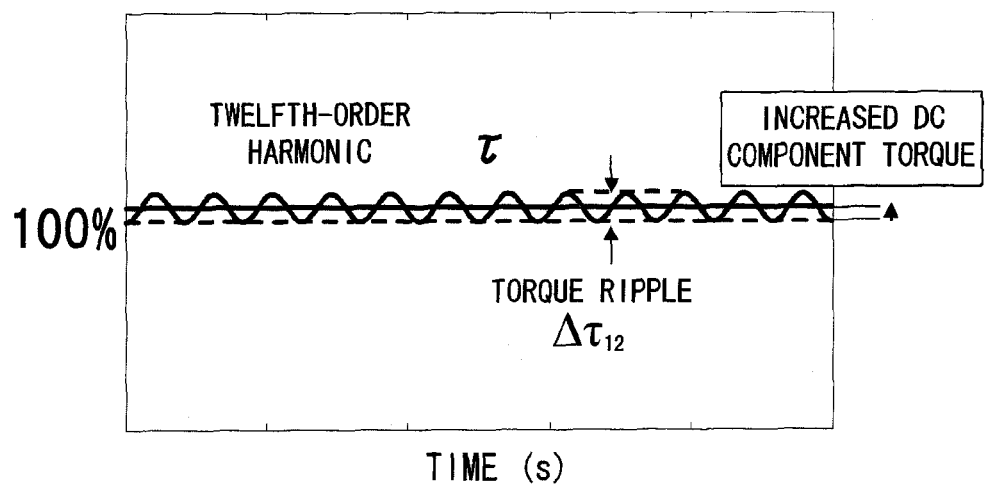
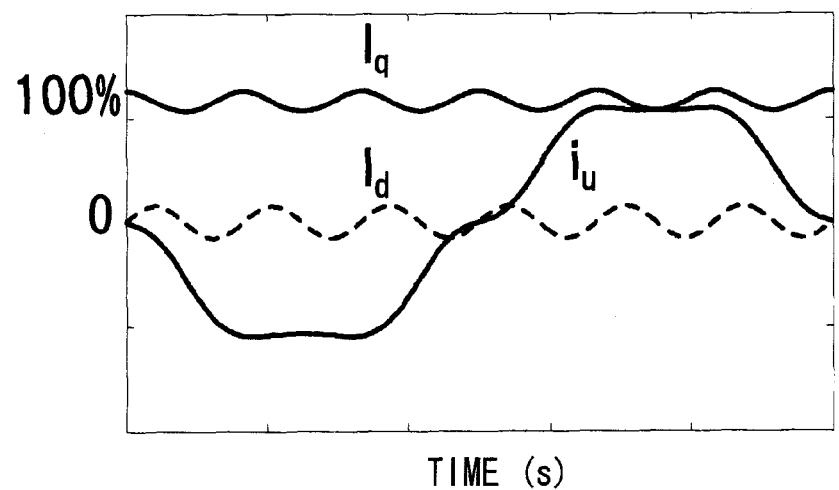

US 8,410,735 B2

TORQUE RIPPLE SUPPRESSION CONTROL DEVICE FOR PERMANENT MAGNET MOTOR AND ELECTRIC POWER STEERING SYSTEM

INCORPORATION BY REFERENCE

The disclosure of the following priority application is herein incorporated by reference: Japanese Patent Application No. 2010-9044 filed Jan. 19, 2010

BACKGROUND OF THE INVENTION

1. Field of the Invention

The present invention relates to a technology for suppressing torque ripple caused by an induced voltage distortion in a permanent magnet motor.

2. Description of Related Art

The following is a method known in the related art that may be adopted to suppress torque ripple when the waveform of a voltage induced in a motor is rectangular when there is a distortion in the induced voltage. In the method, three-phase induced voltage waveforms are converted to a d-axis voltage $e_d$ and a q-axis voltage $e_q$ and the torque ripple is canceled out based upon a q-axis current command value $I_{qref}$ calculated as expressed in (1) below.

$$I_{qref} = \frac{2}{3}\left(T_{ref} \times \frac{\omega_m}{e_q}\right) \quad (1)$$

$T_{ref}$ and $\omega_m$ in expression (1) respectively represent a torque command value and a mechanical angular speed at the motor. Namely, the q-axis current command value $I_{qref}$ containing a pulsation waveform can be calculated as expressed in (1) so as to achieve uniformity in the motor torque even when the waveforms of the induced voltages at the motor are rectangular. The torque ripple can be suppressed by executing vector control in conformance to this current command value.

However, since the current command value $I_{qref}$ contains the pulsation waveform, the q-axis current $I_q$ corresponding to the current command value $I_{qref}$ must be controlled by utilizing a high-response current control system. In other words, the current control response frequency must be set so as to achieve the relationship expressed in (2) below.

$n \times p/2 \times \omega \leq$ upper limit to current control response frequency (2)

n in expression (2) represents a wave component, the order of which is equal to or above 5% of the amplification component resulting from frequency analysis of an artificial rectangular wave simulated for the motor. In addition, P represents the number of poles of the motor and $\omega$ represents the actual rotation rate of the motor.

The torque ripple suppression method described above is disclosed in patent reference 1.

(Patent reference 1) Japanese Laid Open Patent Publication No. 2004-201487

Through the torque ripple suppression method in the related art described above, control under which the torque ripple component that occur when the waveforms of the induced voltages at the motor are rectangular is canceled out, is enabled. The motor torque in this situation is in proportion to the product of a q-axis induced voltage coefficient (notated as $K_{ed}$), which is in proportion to the q-axis voltage $e_q$, and the q-axis current $I_q$. For this reason, a torque ripple DC component is generated in correspondence to the product ($\Delta K_{ed} \times \Delta I_q$) of a pulsation component $\Delta K_{ed}$ in the q-axis induced voltage coefficient $K_{ed}$ and a pulsation component $\Delta I_q$ in the current $I_q$. This torque ripple DC component, however, cannot be effectively utilized in the torque ripple suppression method in the related art.

An object of the present invention is to provide a torque ripple suppression control device and an electric power steering system that enable effective utilization of the torque ripple DC component.

SUMMARY OF THE INVENTION

A torque ripple suppression control device for a permanent magnet motor according to a 1st aspect of the present invention includes: a current command conversion unit that outputs a current command value based upon a torque command value input thereto from an external source; a position detector that outputs a position detection value by detecting a rotational position of the permanent magnet motor; a current detection unit that outputs a current detection value by detecting a current at the permanent magnet motor; an induced voltage coefficient setting unit that outputs, based upon the position detection value, an information signal related to an induced voltage coefficient for an induced voltage at the permanent magnet motor; a torque ripple suppression operation unit that outputs, based upon the information signal and a preset proportional gain, a current correction command value for the permanent magnet motor; a current control operation unit that outputs, based upon addition results obtained by adding together the current command value and the current correction command value and the current detection value, a voltage command value based upon which the permanent magnet motor is to be driven; and a power converter that outputs, based upon the voltage command value, a voltage with which the permanent magnet motor is to be driven.

According to a 2nd aspect of the present invention, in the torque ripple suppression control device of the 1st aspect for a permanent magnet motor, it is preferable that: the current command conversion unit outputs a d-axis current command value and a q-axis current command value corresponding to a d-axis and a q-axis of a rotation coordinate system of the permanent magnet motor; the induced voltage coefficient setting unit outputs information signals related to a d-axis induced voltage coefficient and a q-axis induced voltage coefficient corresponding to the d-axis and the q-axis; the torque ripple suppression operation unit outputs a d-axis current correction command value and a q-axis current correction command value corresponding to the d-axis and the q-axis; and the current control operation unit outputs a d-axis voltage command value and a q-axis voltage command value corresponding to the d-axis and the q-axis based upon addition results obtained by adding together the d-axis current command value and the d-axis current correction command value, addition results obtained by adding together the q-axis current command value and the q-axis current correction command value, and the current detection value.

According to a 3rd aspect of the present invention, the torque ripple suppression control device of the 2nd aspect of the present invention for a permanent magnet motor may further include a coordinate conversion unit that converts the d-axis voltage command value and the q-axis voltage command value to three-phase voltage command values in a stator coordinate system of the permanent magnet motor. In this torque ripple suppression control device for a permanent magnet motor, it is preferred that the power converter outputs the voltage based upon the three-phase voltage command values.

According to a 4th aspect of the present invention, in the torque ripple suppression control device of the 2nd or 3rd aspect of the present invention for a permanent magnet motor, it is preferable that the induced voltage coefficient setting unit outputs, as the information signals, an induced voltage coefficient average value and a pulsation component amplitude value corresponding to at least either the d-axis or the q-axis in addition to the d-axis induced voltage coefficient and the q-axis induced voltage coefficient.

According to a 5th aspect of the present invention, in the torque ripple suppression control device of the 4th aspect of the present invention for a permanent magnet motor, it is desirable that the d-axis induced voltage coefficient and the q-axis induced voltage coefficient each change in correspondence to the position detection value whereas the average value and the pulsation component amplitude value both remain constant, unaffected by the position detection value.

According to a 6th aspect of the present invention, in the torque ripple suppression control device of the 4th or 5th aspect of the present invention for a permanent magnet motor, it is possible that the torque ripple suppression operation unit outputs the q-axis current correction command value based upon a pulsation component in the d-axis induced voltage coefficient and the induced voltage coefficient average value corresponding to the d-axis.

According to a 7th aspect of the present invention, in the torque ripple suppression control device of the 6th aspect of the present invention for a permanent magnet motor, the torque ripple suppression operation unit may output the q-axis current correction command value $\Delta I_q^*$ based upon an expression below:

$$\Delta I_q^* = \sum_{n=1}^{\infty} \left(-\frac{\Delta K_{ed}}{\overline{K}_{ed}}\right)^n \cdot \overline{I}_q,$$

with n, $\Delta K_{ed}$, $\overline{K}_{ed}$ and $\overline{I}_q$ in the expression respectively representing an integer, the pulsation component in the d-axis induced voltage coefficient, the induced voltage coefficient average value corresponding to the d-axis and a current average value corresponding to the q-axis.

According to an 8th aspect of the present invention, in the torque ripple suppression control device of any one of the 4th through 7th aspects of the present invention for a permanent magnet motor, the torque ripple suppression operation unit may output the q-axis current correction command value based upon the proportional gain, pulsation component amplitude values in the d-axis induced voltage coefficient and the q-axis induced voltage coefficient, a pulsation component in the q-axis induced voltage coefficient and the induced voltage coefficient average value corresponding to the d-axis.

According to a 9th aspect of the present invention, in the torque ripple suppression control device of the 8th aspect of the present invention for a permanent magnet motor, the torque ripple suppression operation unit may output the d-axis current correction command value $\Delta I_d^*$ based upon an expression below:

$$\Delta I_d^* = -G \cdot \left(\frac{\overline{\Delta K_{ed}}}{\overline{\Delta K_{eq}}}\right)^2 \cdot \frac{\Delta K_{eq}}{\overline{K}_{ed}} \cdot \overline{I}_q,$$

with G, $\overline{\Delta K_{ed}}$, $\overline{\Delta K_{eq}}$, $\Delta K_{eq}$, $\overline{K}_{ed}$ and $\overline{I}_q$ in the expression respectively representing the proportional gain, the pulsation component amplitude value in the d-axis induced voltage coefficient, the pulsation component amplitude value in the q-axis induced voltage coefficient, the pulsation component in the q-axis induced voltage coefficient, the induced voltage coefficient average value corresponding to the d-axis and a current average value corresponding to the q-axis.

According to a 10th aspect of the present invention, in the torque ripple suppression control device of any one of the 1st through 9th aspects of the present invention for a permanent magnet motor, the current control operation unit may include a pulsation disturbance current control operation unit that outputs a pulsation compensation value obtained based upon the position detection value and a value representing an order of a pulsation frequency in the torque at the permanent magnet motor. In this torque ripple suppression control device for a permanent magnet motor, it is preferable that the current control operation unit adds the pulsation compensation value to a first voltage command value, which is calculated based upon the current detection value and a sum of the current command value and the current correction command value, and outputs addition results as the voltage command value.

According to an 11th aspect of the present invention, in the torque ripple suppression control device of the 10th aspect of the present invention for a permanent magnet motor, the pulsation disturbance current control operation unit may include: a sine signal generation unit that generates a sine signal based upon the position detection value and the value representing the order of the pulsation frequency; a cosine signal generation unit that generates a cosine signal based upon the position detection value and the value representing the order of the pulsation frequency; a sine operation unit that determines a first operation value by multiplying the sine signal by a current deviation representing a difference between the current command value and the current detection value, by multiplying initial multiplication results by a constant and by further multiplying second multiplication results by the sine signal; and a cosine operation unit that determines a second operation value by multiplying the cosine signal by the current deviation, by multiplying initial multiplication results by the constant and by further multiplying second multiplication results by the cosine signal. In this torque ripple suppression control device for a permanent magnet motor, it is possible that the pulsation disturbance current control operation unit outputs, as the pulsation compensation value, a value obtained by doubling a value representing a sum of the first operation value and the second operation value.

According to a 12th aspect of the present invention, in the torque ripple suppression control device of the 11th aspect of the present invention for a permanent magnet motor, the sine signal generation unit and the cosine signal generation unit can respectively output a sine value and a cosine value corresponding to a value obtained by multiplying the position detection value by the value representing the order of the pulsation frequency as the sine signal and the cosine signal.

According to a 13th aspect of the present invention, in the torque ripple suppression control device of any one of the 10th through 12th aspects of the present invention for a permanent magnet motor, it is preferable that: the pulsation disturbance current control operation unit outputs the pulsation compensation value in correspondence to at least either the d-axis or the q-axis in the rotation coordinate system of the permanent magnet motor; and the current control operation unit outputs, as the voltage command value, a sum of the first voltage command value and the pulsation compensation value in correspondence to an axis for which the pulsation compensation value has been output by the pulsation disturbance current control operation unit and outputs, as the voltage command value, the first voltage command value in correspondence to an axis for which the pulsation compensation value has not been output by the pulsation disturbance current control operation unit.

According to a 14th aspect of the present invention, in the torque ripple suppression control device of any one of the 2nd through 9th aspects of the present invention for a permanent magnet motor, it is possible that the induced voltage coefficient setting unit outputs information signals related to the d-axis induced voltage coefficient and the q-axis induced voltage coefficient based upon the position detection value, the d-axis voltage command value and the q-axis voltage command value.

According to a 15th aspect of the present invention, in the torque ripple suppression control device of any one of the 10th through 13th aspects of the present invention for a permanent magnet motor, it is possible that: the pulsation disturbance current control operation unit outputs a d-axis pulsation compensation value and a q-axis pulsation compensation value in correspondence to a d-axis and a q-axis of a rotation coordinate system of the permanent magnet motor; and the induced voltage coefficient setting unit outputs information signals related to a d-axis induced voltage coefficient and a q-axis induced voltage coefficient corresponding to the d-axis and the q-axis based upon the position detection value, the d-axis pulsation compensation value and the q-axis pulsation compensation value.

According to a 16th aspect of the present invention, in the torque ripple suppression control device of any one of the 1st through 15th aspects of the present invention for a permanent magnet motor, it is desirable that the power converter increases a DC torque in the permanent magnet motor by an extent equivalent to substantially half of an amplitude of a pulsating torque component in a twelfth-order harmonic in the permanent magnet motor, relative to a DC torque generated by driving the permanent magnet motor based upon a voltage command value output from the current control operation unit without adding the current correction command value to the current command value.

An electric power steering system according to a 17th aspect of the present invention includes: a torque ripple suppression control device for a permanent magnet motor according to any one of the 1st through 16th aspects; the permanent magnet motor; a steering shaft mechanically connected to the permanent magnet motor via a reduction gear unit; a steering wheel mechanically connected to the steering shaft; a torque sensor that detects an operation input via the steering wheel; and a torque command unit that outputs the torque command value based upon operation detection results provided by the torque sensor.

The present invention provides a torque ripple suppression control device and an electric power steering system that enable effective utilization of the torque ripple DC component.

BRIEF DESCRIPTION OF THE DRAWINGS

FIG. 8 shows torque control characteristics that may be achieved by sinusoidally driving a magnet motor with distorted induced voltage waveform.

FIG. 9 shows torque control characteristics that may be achieved through torque ripple suppression compensation.

DESCRIPTION OF PREFERRED EMBODIMENTS

The following is a detailed description of embodiments of the present invention, given in reference to the drawings.

First Embodiment

Figure 1:
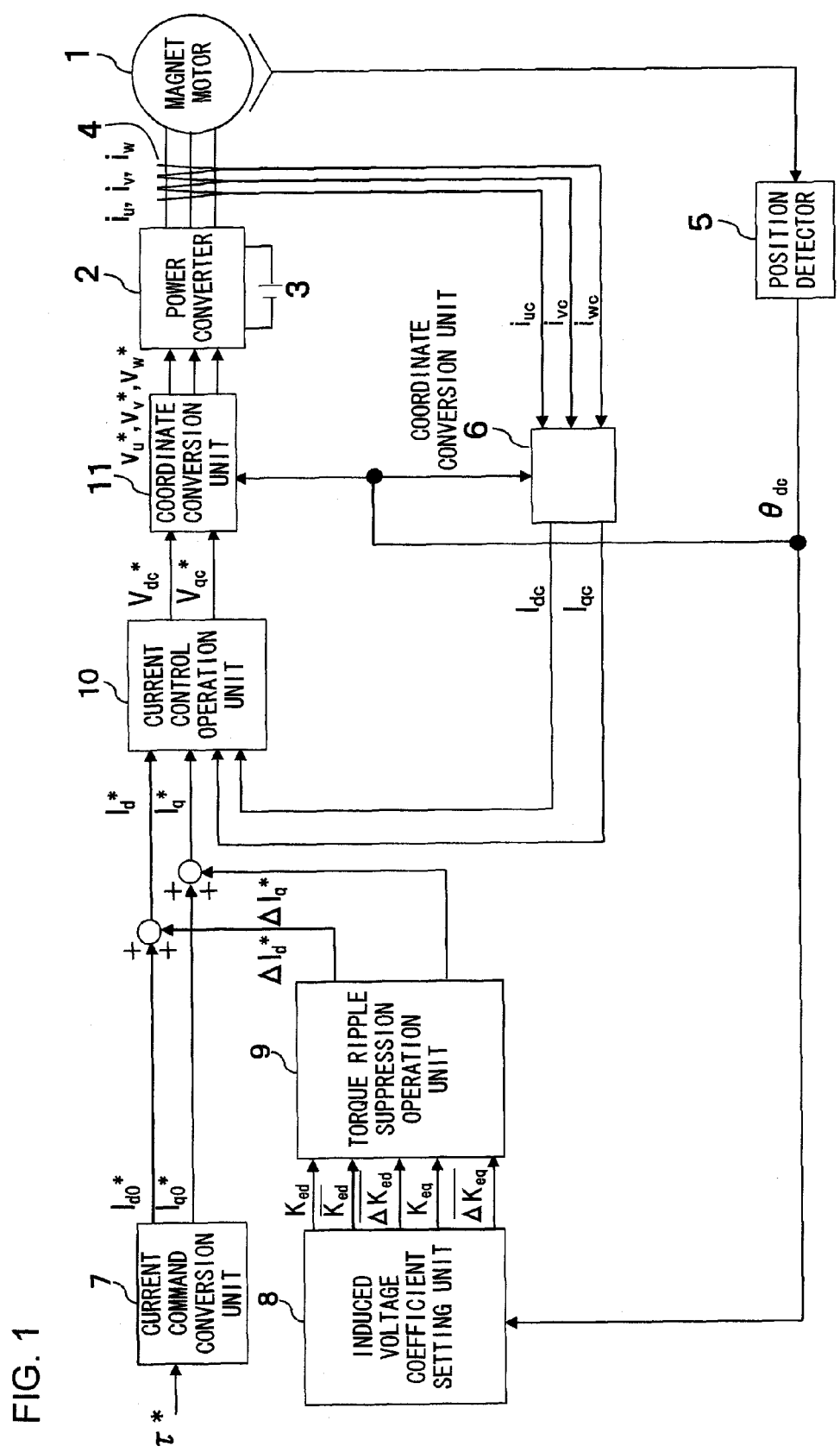
FIG. 1 is a block diagram showing the structure of a permanent magnet motor torque pulsation suppression control device achieved in an embodiment of the present invention.

FIG. 1 presents an example of a structure that may be adopted in a permanent magnet motor torque ripple suppression control device achieved in an embodiment of the present invention. A magnet motor 1 outputs a motor torque generated by combining a torque component attributable to magnetic fluxes from permanent magnets and a torque component attributable to the inductance at an armature winding. A power converter 2 outputs voltages in proportion to three-phase AC voltage command values $v_u^*$, $v_v^*$ and $v_w^*$ so as to adjust the output voltage and the rotation rate of the magnet motor 1.

A DC power source 3 provides a DC voltage to the power converter 2. A current detection unit 4 detects three-phase AC currents $i_u$, $i_v$ and $i_w$ flowing at the magnet motor 1 and outputs current detection values $i_{uc}$, $i_{vc}$ and $i_{wc}$. A position detector 5 detects a rotational position $\theta$ of the motor and outputs a position detection value $\theta_{dc}$. The position detector 5 may be constituted with, for instance, a resolver or an encoder.

A coordinate conversion unit 6 calculates, through operation executed by using the three-phase AC current detection values $i_{uc}$, $i_{vc}$ and $i_{wc}$ and the position detection value $\theta_{dc}$ mentioned above, a d-axis current detection value $I_{dc}$ and a q-axis current detection value $I_{qc}$, and outputs the calculated current detection values. A current command conversion unit 7 calculates, through operation executed based upon a torque command value $\tau^*$ a d-axis current command value $I_{d0}^*$ and a q-axis current detection value $I_{q0}^*$, and outputs the calculated current command values.

An induced voltage coefficient setting unit 8, to which the position detection value $\theta_{dc}$ from the position detector 5 is input, outputs induced voltage coefficient information signals $K_{ed}$, $^-K_{ed}$, $^-\Delta K_{ed}$, $K_{eq}$ and $^-\Delta K_{eq}$. It is to be noted that the specific information provided in these induced voltage coefficient information signals is to be described in detail later. A torque ripple suppression operation unit 9 outputs a d-axis current correction command value $\Delta I_d^*$ and a q-axis current correction command value $\Delta I_q^*$ calculated based upon the various information signals output from the induced voltage coefficient setting unit 8 as described above. These current correction command values $\Delta I_d^*$ and $\Delta I_q^*$ are respectively added to the d-axis current command value $I_{d0}^*$ and the q-axis current command value $I_{q0}^*$ output from the current command conversion unit 7. Current command values $I_{d0}^*$ and $I_{q0}^*$ indicating the sums are input as new current command values $I_d^*$ and $I_q^*$ to a current control operation unit 10.

The current control operation unit 10 executes proportional·integration operation based upon the current command values $I_d^*$ and $I_q^*$ so that the d-axis current detection value $I_{dc}$ and the q-axis current detection value $I_{qc}$ respectively conform to the current command values $I_d^*$ and $I_q^*$ and outputs a d-axis voltage command value $V_{dc}^*$ and a q-axis voltage command value $V_{qc}^*$ to a coordinate conversion unit 11 in correspondence to the proportional·integration operation results. The coordinate conversion unit 11 outputs three-phase AC voltage command values $v_u^*$, $v_v^*$ and $v_w^*$, determined by using the d-axis voltage command value $V_{dc}^*$ and the q-axis voltage command value $V_{qc}^*$ provided by the current control operation unit 10 and the position detection value $\theta_{dc}$ provided by the position detector 5, to the power converter 2. Drive control for the magnet motor 1 is executed as the power converter 2 adjusts the output voltage and the rotation rate of the magnet motor 1 as described earlier based upon the voltage command values $v_u^*$, $v_v^*$ and $v_w^*$.

Figure 2:
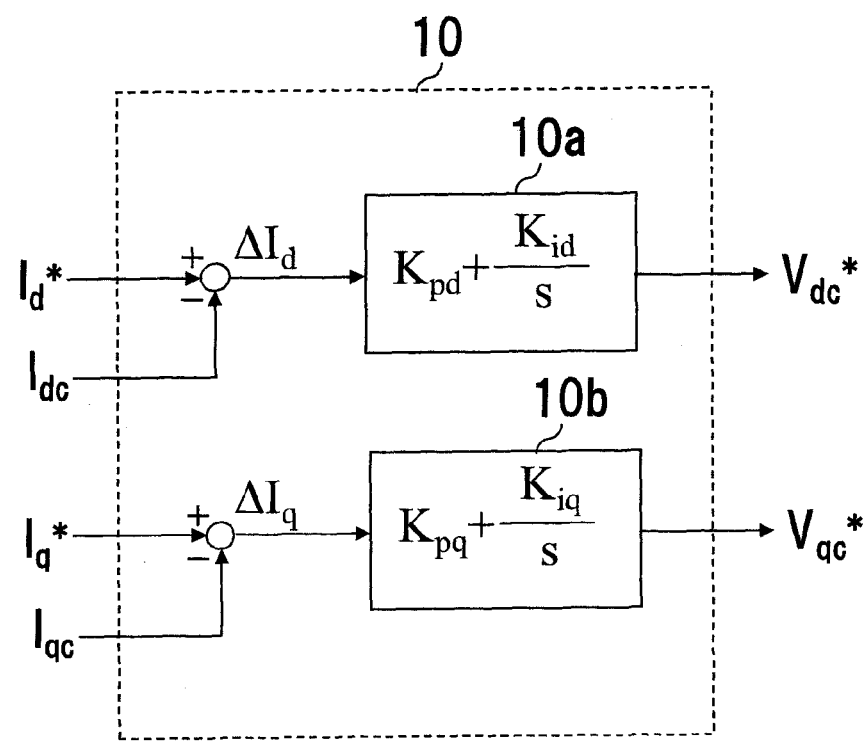
FIG. 2 shows the structure of the current control operation unit.

Next, the basic voltage control operation and the basic phase control operation executed by adopting a vector control method are described. The basic voltage control operation is first explained. FIG. 2 shows the structure of the current control operation unit 10. FIG. 2 shows that the d-axis current command value $I_d^*$ and the d-axis current detection value $I_{dc}$ are input to a d-axis current control operation unit 10a and that the q-axis current command value $I_q^*$ and the q-axis current detection value $I_{qc}$ are input to a q-axis current control operation unit 10b. The current control operation units 10a and 10b respectively output the d-axis voltage command value $V_{dc}^*$ and the q-axis voltage command value $V_{qc}^*$ by individually executing proportional·integration operation as expressed in (3) below so as to ensure that the current detection values $I_{dc}$ and $I_{qc}$ corresponding to the respective components conform to the current command values $I_{d0}^*$ and $I_{q0}^*$.

$$\begin{cases} V_{dc}^* = (I_d^* - I_{dc}) \cdot \left(K_{pd} + \dfrac{K_{id}}{s}\right) \\ V_{qc}^* = (I_q^* - I_{qc}) \cdot \left(K_{pq} + \dfrac{K_{iq}}{s}\right) \end{cases} \quad (3)$$

In expression (3), $K_{pd}$ represents a proportional gain for d-axis current control, $K_{id}$ represents an integral gain for the d-axis current control, $K_{pq}$ represents a proportional gain for q-axis current control and $K_{iq}$ represents an integral gain for the q-axis current control.

In the phase control operation, the position detection value $\theta_{dc}$ is obtained by detecting the rotational position $\theta$ of the magnet motor 1 via the position detector 5, which may be constituted with a resolver, an encoder, a magnetic pole position detector or the like. Based upon the position detection value $\theta_{dc}$, the coordinate conversion units 6 and 11 execute coordinate conversion respectively as expressed in (4) and (5) below.

$$\begin{bmatrix} I_{dc} \\ I_{qc} \end{bmatrix} = \dfrac{2}{3} \cdot \begin{bmatrix} \cos(\theta_{dc}) & \sin(\theta_{dc}) \\ -\sin(\theta_{dc}) & \cos(\theta_{dc}) \end{bmatrix} \cdot \begin{bmatrix} 1 & -\dfrac{1}{2} & -\dfrac{1}{2} \\ 0 & \dfrac{\sqrt{3}}{2} & -\dfrac{\sqrt{3}}{2} \end{bmatrix} \cdot \begin{bmatrix} i_{uc} \\ i_{vc} \\ i_{wc} \end{bmatrix} \quad (4)$$

$$\begin{bmatrix} v_u^* \\ v_v^* \\ v_w^* \end{bmatrix} = \begin{bmatrix} 1 & 0 \\ \dfrac{1}{2} & \dfrac{\sqrt{3}}{2} \\ -\dfrac{1}{2} & -\dfrac{\sqrt{3}}{2} \end{bmatrix} \cdot \begin{bmatrix} \cos(\theta_{dc}) & -\sin(\theta_{dc}) \\ \sin(\theta_{dc}) & \cos(\theta_{dc}) \end{bmatrix} \cdot \begin{bmatrix} V_{dc}^* \\ V_{qc}^* \end{bmatrix} \quad (5)$$

The basic voltage control operation and the basic phase control operations are executed as described above.

Figure 3:
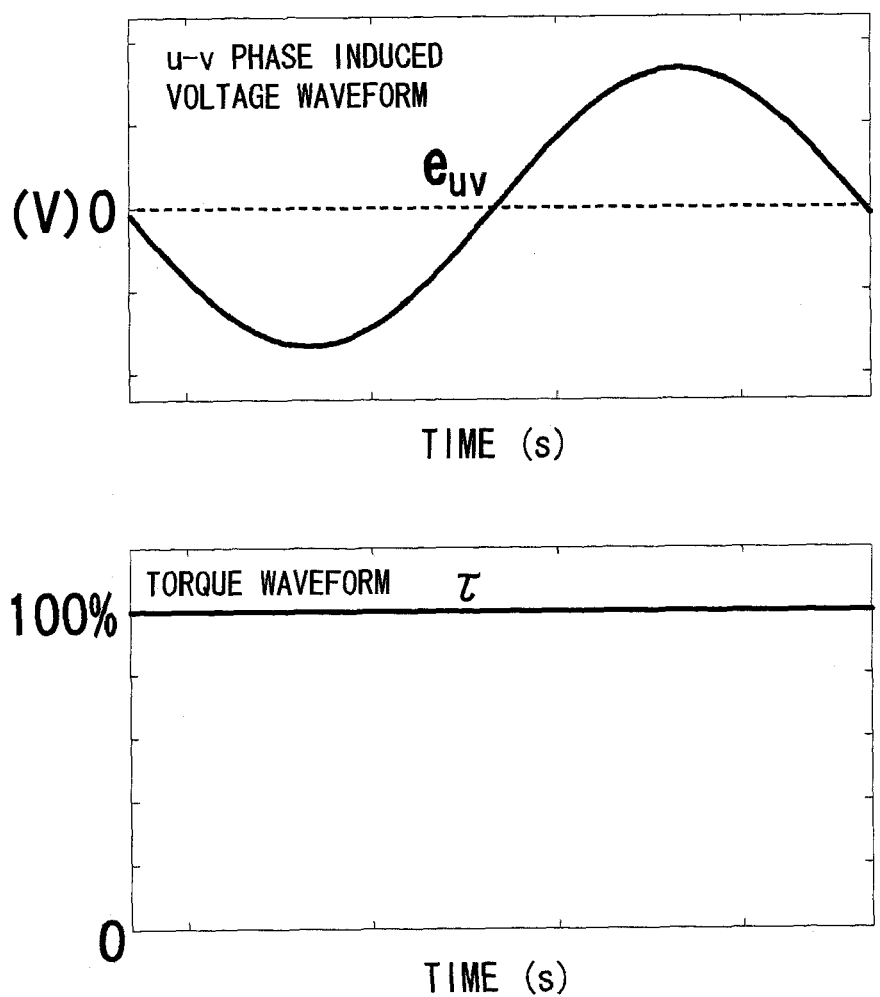
FIG. 3 shows torque characteristics that may manifest when the waveform of an induced voltage at a magnet motor is a sine waveform.
Figure 4:
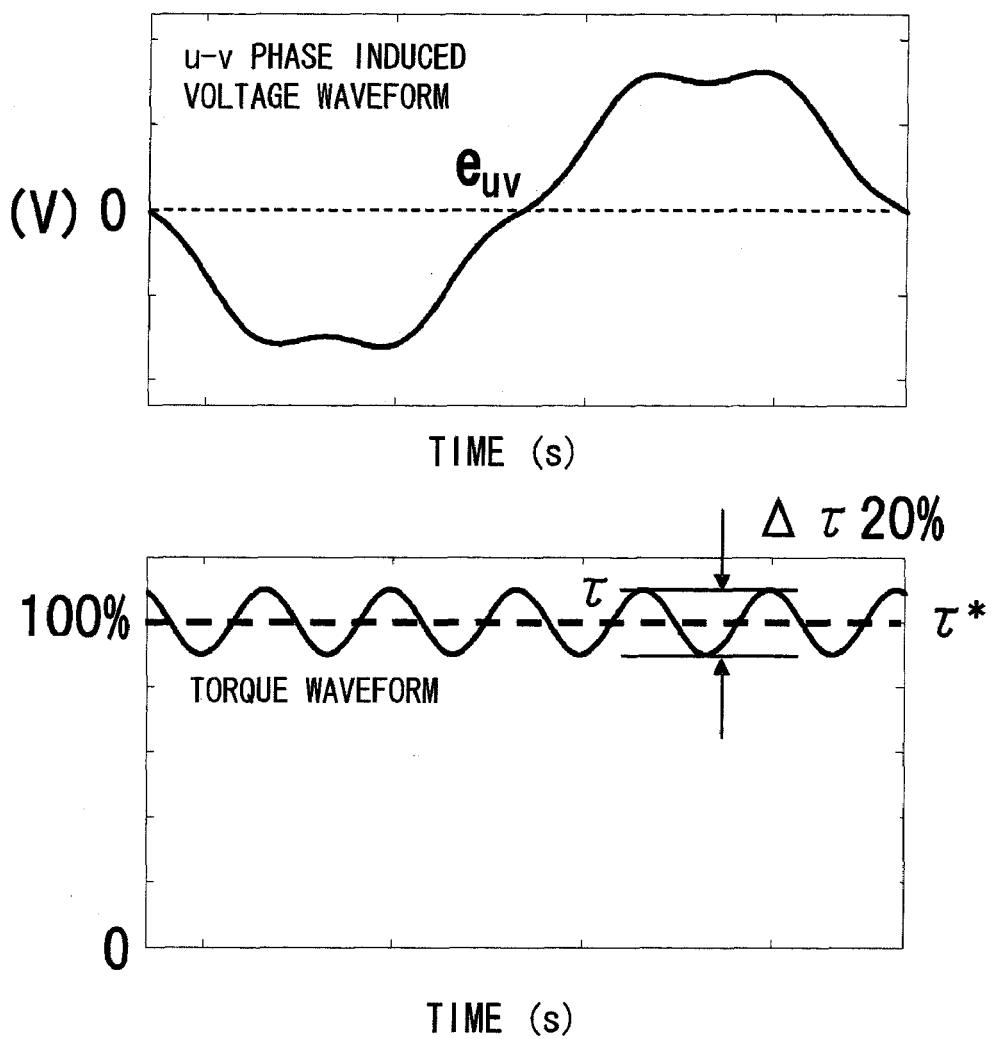
FIG. 4 shows torque characteristics that may manifest when the waveform of an induced voltage at the magnet motor is distorted.

Next, the control characteristics that will manifest in a structure that does not include the induced voltage coefficient setting unit 8 and the torque ripple suppression operation unit 9, i.e., the features characterizing the present invention, are described. FIGS. 3 and 4 show the effect of the waveform $e_{uv}$ of an induced voltage (u-phase v-phase line voltage) at the permanent magnet motor 1 on the torque characteristics of the magnet motor 1 under control executed by the control device in FIG. 1.

FIG. 3 indicates the relationship that will be manifested by the induced voltage waveform $e_{uv}$ and the motor torque $\tau$ when the induced voltage waveform $e_{uv}$ is sinusoidal. As FIG. 3 indicates, the motor torque $\tau$ equals 100% of the command value $\tau^*$, which means that stable control is achieved with no torque ripple.

FIG. 4 indicates the relationship that may be manifested by the induced voltage waveform $e_{uv}$ and the motor torque $\tau$ when the induced voltage waveform $e_{uv}$ is rectangular. In the example presented in FIG. 4, the waveforms of the induced voltages in the individual phases (the u-phase, the v-phase and the w-phase) each include a fifth-order harmonic component at a ration of 10%. The figure indicates that torque ripple $\Delta\tau$ occurs at a rate as high as 20% in a sixth-order harmonic component relative to the torque command value $\tau^*$ representing 100%.

Figure 5:
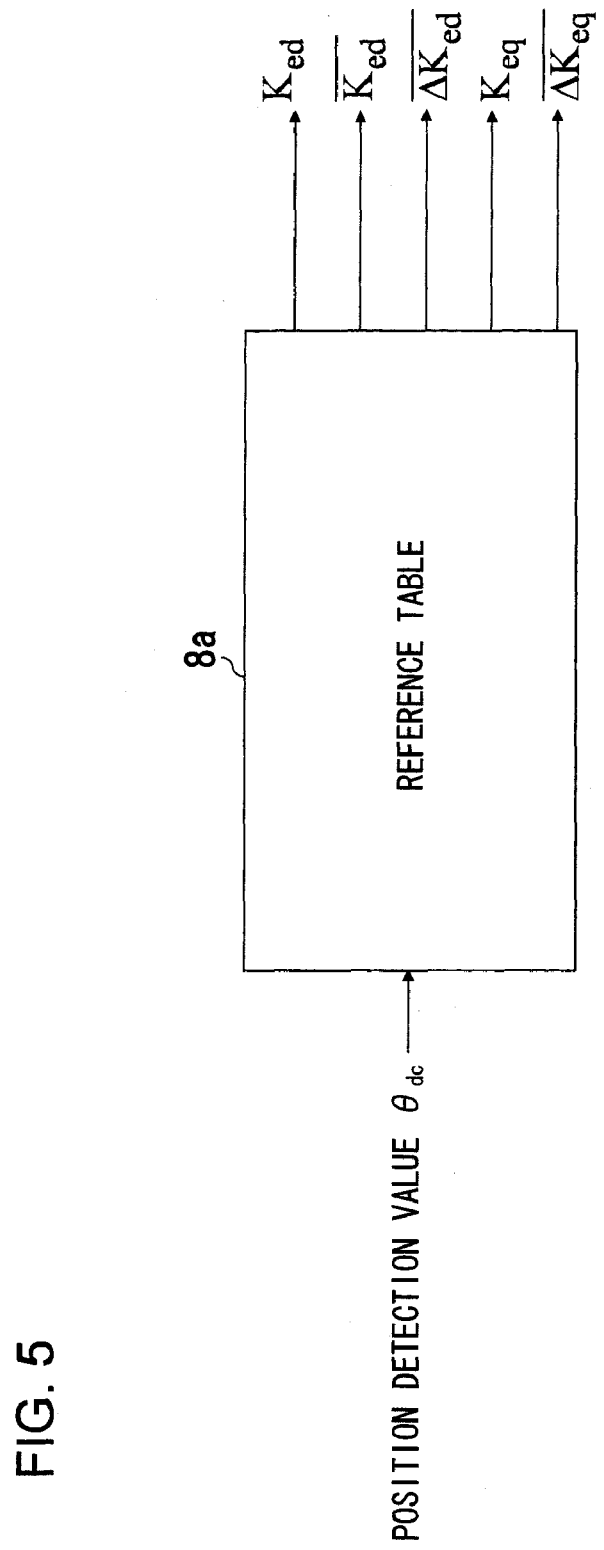
FIG. 5 shows the structure of the induced voltage coefficient setting unit.

Next, the structures adopted for the induced voltage coefficient setting unit 8 and the torque ripple suppression operation unit 9, which are features characterizing the present invention, are described. FIG. 5 shows the structure of the induced voltage setting unit 8. The position detection value $\theta_{dc}$ is input to a reference table 8a at the induced voltage setting unit 8. The reference table 8a is created by storing in advance induced voltage coefficient values corresponding to various motor rotational positions, in a table format. By referencing the induced voltage coefficient values in this table, the induced voltage setting unit 8 is able to output the induced voltage coefficient information signals $K_{ed}$, $^-K_{ed}$, $^-\Delta K_{ed}$, $K_{eq}$ and $^-\Delta K_{eq}$ corresponding to the position detection value $\theta_{dc}$ having been input to the table.

Figure 6:
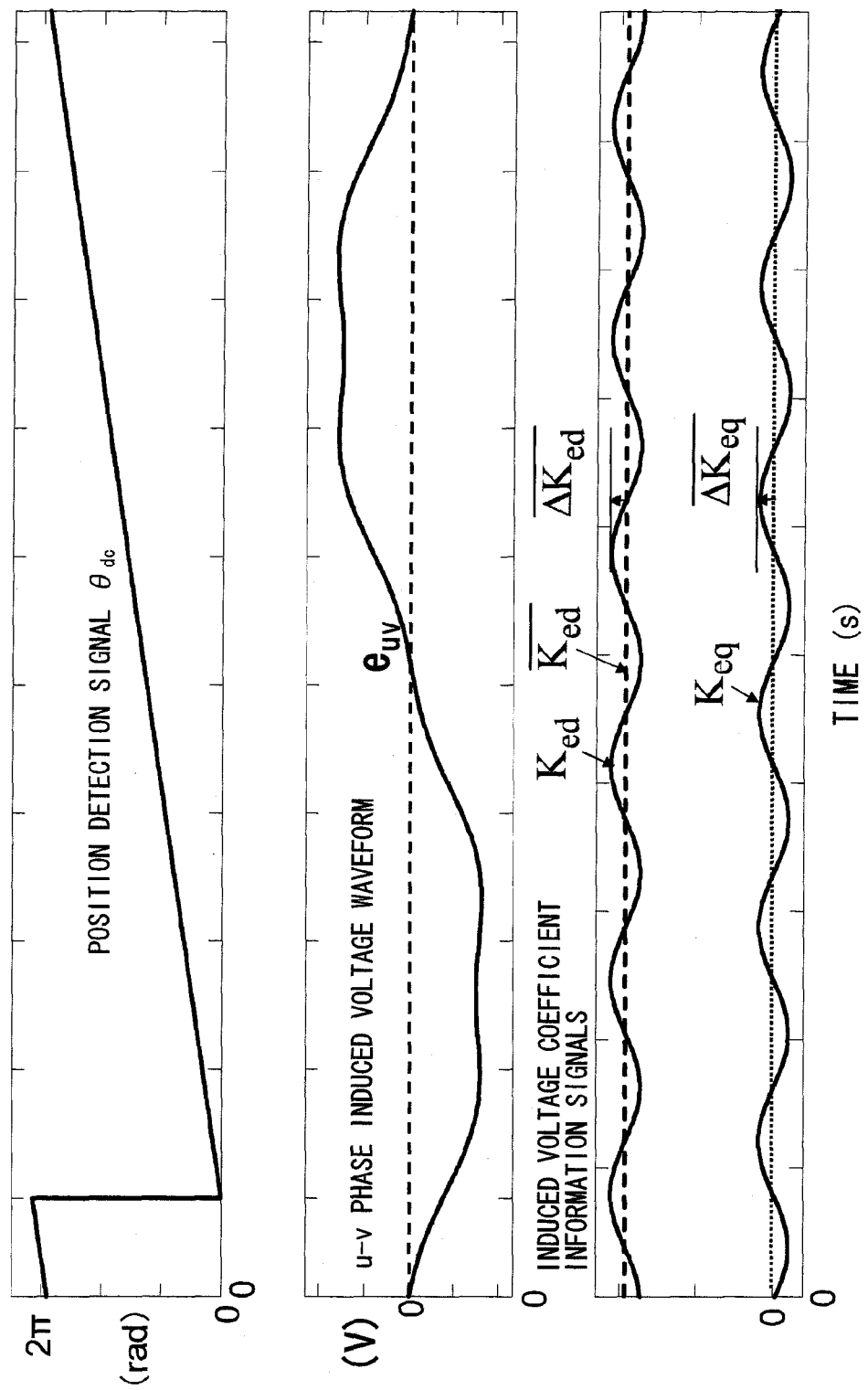
FIG. 6 presents diagrams indicating the relationship between the position signal and the induced voltage coefficient information signals.

FIG. 6 shows the relationship between the position detection signal $\theta_{dc}$ and the induced voltage coefficient information signals output from the induced voltage setting unit 8. As the position detection signal $\theta_{dc}$ changes, induced voltage coefficient information signals $K_{ed}$, $^-K_{ed}$, $^-\Delta K_{ed}$, $K_{eq}$ and $^-\Delta K_{eq}$ such as those indicated in the third diagram in FIG. 6 are output from the reference table. These induced voltage coefficient information signals are obtained by breaking down three-phase AC induced voltage coefficients $K_e$ (each obtained by dividing an induced voltage value by an electrical angular speed $\omega$ of the motor) in a stator coordinate system into a d-axis component value $K_{ed}$ and a q-axis component value $K_{eq}$ in a rotor coordinate system. It is to be noted that the second diagram in FIG. 6 indicates the induced voltage waveform $e_{uv}$ in FIG. 4 for reference.

$K_{ed}$ and $K_{eq}$ in FIG. 6 respectively indicate a d-axis induced voltage coefficient and a q-axis induced voltage coefficient. In addition, $^-K_{ed}$ indicates an average of d-axis induced voltage coefficients $K_{ed}$, $^-\Delta K_{ed}$ indicates an amplitude value of a pulsation component in the d-axis induced voltage coefficient $K_{ed}$ and $^-\Delta K_{eq}$ indicates an amplitude value of a pulsation component in the q-axis induced voltage coefficient $K_{eq}$. As FIG. 6 indicates, the d-axis induced voltage coefficient $K_{ed}$ and the q-axis induced voltage coefficient $K_{eq}$ both change in correspondence to the position detection value $\theta_{dc}$. In contrast, the average $^-K_{ed}$ of the d-axis induced voltage coefficients and the amplitude values $^-\Delta K_{ed}$ and $^-\Delta K_{eq}$ of the pulsation components in the d-axis induced voltage coefficient and the q-axis induced voltage coefficient all remain constant even if the position detection value $\theta_{dc}$ changes.

Figure 7:
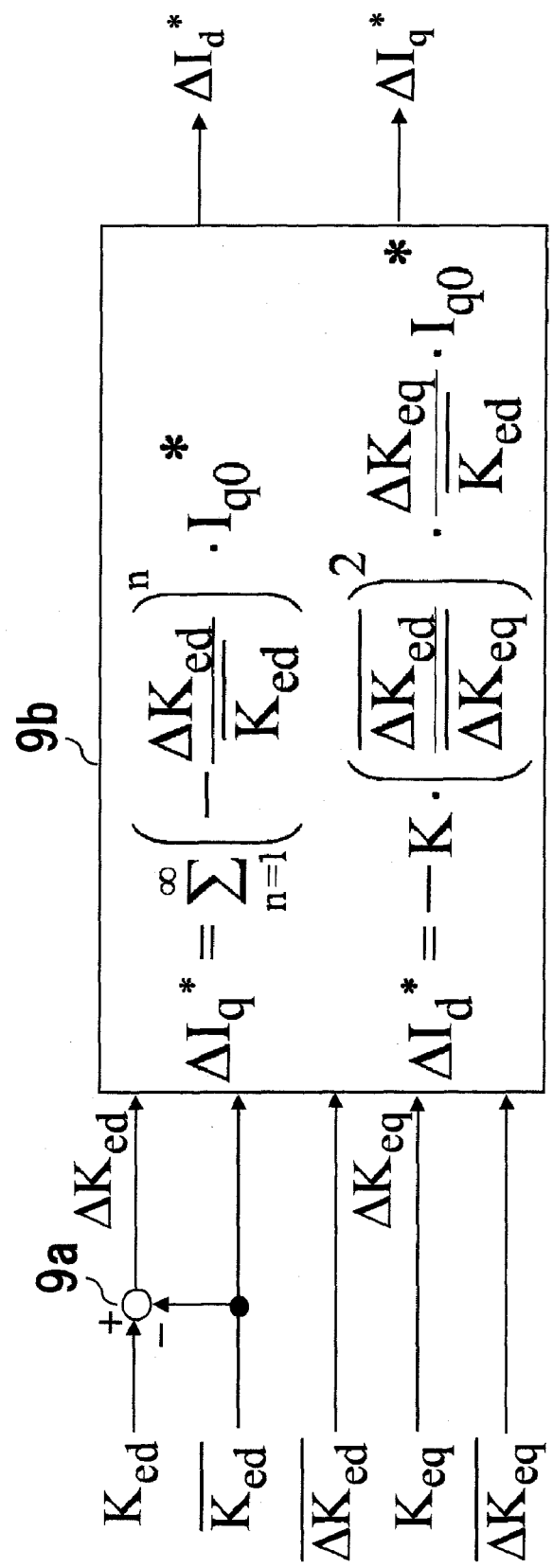
FIG. 7 shows the structure of the torque ripple suppression operation unit.

The structure of the torque ripple suppression operation unit 9 is shown in FIG. 7. The signals $K_{ed}$ and $^-K_{ed}$, among the induced voltage coefficient information signals output from the induced voltage setting unit 8 as described above, are input to a subtraction unit 9a of the torque ripple suppression operation unit 9. Based upon the signals $K_{ed}$ and $^-K_{ed}$ input thereto, the subtraction unit 9a calculates the pulsation component $\Delta K_{ed}$ in the d-axis induced voltage coefficient $K_{ed}$ as expressed in (6) below.

$$\Delta K_{ed} = K_{ed} - \overline{K_{ed}} \tag{6}$$

It is to be noted that since the signal $K_{eq}$ provided from the induced voltage setting unit 8 contains no DC component, the signal $K_{eq}$ itself is designated as the pulsation component $\Delta K_{eq}$ in the q-axis induced voltage coefficient $K_{eq}$ in FIG. 7.

The pulsation component $\Delta K_{ed}$ in the d-axis induced voltage $K_{ed}$ and the pulsation component $\Delta K_{eq}$ in the q-axis induced voltage coefficient $K_{eq}$ described above are all input to a current correction command operation unit 9b together with the amplitude value $^-\Delta K_{ed}$ of the pulsation component in the d-axis induced voltage $K_{ed}$ and the amplitude value $^-\Delta K_{eq}$ of the pulsation component $\Delta K_{eq}$ in the q-axis induced voltage coefficient $K_{eq}$ output from the induced voltage setting unit 8. The current correction command operation unit 9b calculates a d-axis current correction command value $\Delta I_d^*$ and a q-axis current correction command value $\Delta I_q^*$ as expressed in (7) below based upon these values input thereto.

$$\Delta I_q = \sum_{n=1}^{\infty} \left( -\frac{\Delta K_{ed}}{\overline{K_{ed}}} \right)^n \cdot \overline{I_q} \tag{7}$$

$$\Delta I_d = -G \cdot \left( \frac{\overline{\Delta K_{ed}}}{\overline{\Delta K_{eq}}} \right)^2 \cdot \frac{\Delta K_{eq}}{\overline{K_{ed}}} \cdot \overline{I_q}$$

While the order n in expression (7) should ideally be infinite, a fully satisfactory effect can be achieved with n set to approximately 3 in reality. In addition, G in expression (7) represents a proportional gain. As explained later, the ripple component and the DC component in the torque ripple can be controlled so as to sustain a desired specific relationship by adjusting the value of the proportional gain G.

Next, the principle upon which the torque ripple suppression operation unit 9 characterizing the present invention operates is described. The motor torque $\tau_m$ manifesting on the d-q axes may be calculated as expressed in (8) below.

$$\tau_m = \frac{3}{2} \cdot P_m \cdot [(L_d - L_q) I_d \cdot I_q + K_{ed} \cdot I_q - K_{eq} \cdot I_d] \tag{8}$$

$P_m$, $L_d$ and $L_q$ in expression (8) respectively represent the number of pairs of poles at the motor, the inductance value assumed on the d-axis and the inductance value assumed on the q-axis.

In addition, the d-axis induced voltage coefficient $K_{ed}$ and the q-axis induced voltage coefficient $K_{eq}$ can be expressed as in (9) below by using the pulsation components $\Delta K_{ed}$ and $\Delta K_{eq}$ and the average $^-K_{ed}$ of d-axis induced voltage coefficients $K_{ed}$.

$$\begin{bmatrix} K_{eq} \\ K_{ed} \end{bmatrix} = \begin{bmatrix} \Delta K_{eq} \\ \Delta K_{ed} + \overline{K_{ed}} \end{bmatrix} \tag{9}$$

In addition, the d-axis current $I_d$ and the q-axis current $I_q$ can be expressed as in (10), in which $\Delta I_d$ and $\Delta I_q$ respectively represent the pulsation components of the currents $I_d$ and $I_q$ and $^-I_d$ and $^-I_q$ respectively represent the average values of the currents $I_d$ and $I_q$.

$$\begin{bmatrix} I_d \\ I_q \end{bmatrix} = \begin{bmatrix} \Delta I_d + \overline{I_d} \\ \Delta I_q + \overline{I_q} \end{bmatrix} \tag{10}$$

The motor torque expression in (8) can be rewritten as (11) below by using expressions (9) and (10) above for substitution in expression (8).

$$\tau_m = \frac{3}{2} \cdot P_m \cdot \{(L_d - L_q) \cdot (\Delta I_d + \overline{I_d}) \cdot (\Delta I_q + \overline{I_q})\} + \tag{11}$$

$$\frac{3}{2} \cdot P_m \cdot [(\Delta K_{ed} + \overline{K_{ed}}) \cdot (\Delta I_q + \overline{I_q}) - \Delta K_{eq} \cdot (\Delta I_d + \overline{I_d})]$$

A relationship expressed as $L_d = L_q$ exists in a motor with non-salient poles and thus, expression (11) can be modified to expression (12) in conjunction with a motor with non-salient poles.

$$\tau_m = \frac{3}{2} \cdot P_m \cdot [(\Delta K_{ed} + \overline{K_{ed}}) \cdot (\Delta I_q + \overline{I_q}) - \Delta K_{eq} \cdot (\Delta I_d + \overline{I_d})] \quad (12)$$

Sinusoidal control whereby the AC current $i_u$, $i_v$ and $i_w$, at the magnet motor 1 are controlled to achieve a sine wave is now contemplated. Under such circumstances, assuming that ideal current control is possible with $I_d=0$ ($\Delta I_d = \overline{I_d} = 0$) and $I_q = I_q^*$ ($\Delta I_q = 0$), expression (12) can be rewritten as expression (13) below.

$$\tau_m = \frac{3}{2} \cdot P_m \cdot (\Delta K_{ed} + \overline{K_{ed}}) \cdot \overline{I_q} \quad (13)$$

In addition, since the sixth-order harmonic component of the electrical angle is superimposed on the motor torque, the pulsation component $\Delta K_{ed}$ in the d-axis induced voltage coefficient $K_{ed}$ can be defined as in (14) below.

$$\Delta K_{ed} = \overline{\Delta K_{ed}} \cdot \sin(6\theta) \quad (14)$$

The following expression (15) is obtained by using expression (14) for substitution in expression (13).

$$\tau_m = \frac{3}{2} \cdot P_m \cdot (\overline{\Delta K_{ed}} \cdot \sin(6\theta) + \overline{K_{ed}}) \cdot \overline{I_q} \quad (15)$$

FIG. 8 indicates the torque control characteristics achieved as expressed in (15). These control characteristics are torque characteristics manifesting when the drive of the magnet motor 1 is controlled without implementing the suppression compensation according to the present invention, i.e., the torque characteristics manifesting when the drive of the magnet motor 1 is controlled by using the voltage command values output from the current control operation unit 10 without adding the current correction command values $\Delta I_d^*$ and $\Delta I_q^*$ provided from the torque ripple suppression operation unit 9 to the current command values $I_{d0}^*$ and $I_{q0}^*$. FIG. 8 indicates that while the u-phase current $i_u$, assumes a sine wave, torque pulsation (torque ripple) occurs to an extent of 20% (±10%) due to $\Delta K_{ed}$.

Next, a method that may be adopted for torque ripple suppression is described. The q-axis pulsation current command value $\Delta I_q^*$ is calculated as expressed in (16) below through operation executed in the torque ripple suppression operation unit 9.

$$\Delta I_q^* = \sum_{n=1}^{\infty} \left(-\frac{\Delta K_{ed}}{K_{ed}}\right)^n \cdot \overline{I_q} \left( \begin{array}{l} -\left(\frac{\Delta K_{ed}}{K_{ed}}\right)^1 + \left(\frac{\Delta K_{ed}}{K_{ed}}\right)^2 - \left(\frac{\Delta K_{ed}}{K_{ed}}\right)^3 + \\ \left(\frac{\Delta K_{ed}}{K_{ed}}\right)^4 - \left(\frac{\Delta K_{ed}}{K_{ed}}\right)^5 + \left(\frac{\Delta K_{ed}}{K_{ed}}\right)^6 \ldots \end{array} \right) \cdot \overline{I_q} \quad (16)$$

The order n in expression (16) is an integer equal to or greater than 1. For instance, expression (16) can be modified as expression (17) below by assuming that the expression includes up to a third-order term.

$$\Delta I_q^* \approx \left(-\left(\frac{\Delta K_{ed}}{K_{ed}}\right)^1 + \left(\frac{\Delta K_{ed}}{K_{ed}}\right)^2 - \left(\frac{\Delta K_{ed}}{K_{ed}}\right)^3\right) \cdot \overline{I_q} \quad (17)$$

The motor torque $\tau_m$, can be calculated as expressed in (18) by using expression (17) for substitution in expression (12) described earlier.

$$\tau_m = \frac{3}{2} \cdot P_m \cdot \overline{I_q} \cdot (\Delta K_{ed} + \overline{K_{ed}}) \cdot$$

$$\left(\left(-\left(\frac{\Delta K_{ed}}{K_{ed}}\right)^1 + \left(\frac{\Delta K_{ed}}{K_{ed}}\right)^2 - \left(\frac{\Delta K_{ed}}{K_{ed}}\right)^3\right) + 1\right)$$

$$= \frac{3}{2} \cdot P_m \cdot \overline{I_q} \cdot \left( \begin{array}{l} -\frac{\Delta K_{ed}^2}{K_{ed}} + \frac{\Delta K_{ed}^3}{K_{ed}^2} - \frac{\Delta K_{ed}^4}{K_{ed}^3} + \\ \Delta K_{ed} - \Delta K_{ed} + \frac{\Delta K_{ed}^2}{K_{ed}} - \\ \frac{\Delta K_{ed}^3}{K_{ed}^2} + \overline{K_{ed}} \end{array} \right)$$

$$= \frac{3}{2} \cdot P_m \cdot \overline{I_q} \cdot \left(\frac{\Delta K_{ed}^4}{K_{ed}^3} \cdot \sin^4[6\theta] + \overline{K_{ed}}\right) \quad (18)$$

The intensity of the pulsating torque component in expression (18) can be expressed as in (19) below.

$$\frac{\Delta K_{ed}^4}{K_{ed}^3} \approx 0 \quad (19)$$

Namely, the pulsating torque component can be reduced to almost 0.

However, no DC torque increase/decrease can be induced simply by eliminating the pulsating torque component almost completely, as described above. Accordingly, a DC torque component must be secured by using the d-axis pulsation current command value $\Delta I_d^*$. More specifically, $\Delta I_d^*$ is calculated as expressed in (20) below.

$$\Delta I_d^* = -G \cdot \left(\frac{\Delta K_{ed}}{\Delta K_{eq}}\right)^2 \cdot \frac{\Delta K_{eq}}{K_{ed}} \cdot \overline{I_q} \quad (20)$$

In a manner similar to that through which expression (18) is obtained as described earlier, expression (21), through which the motor torque $\tau_m$ is calculated, can be obtained by using expressions (17) and (20) for substitution in expression (12).

$$\tau_m = \frac{3}{2} \cdot P_m \cdot \overline{I_q} \cdot \left(\left(-\frac{\overline{\Delta K_{ed}^4}}{K_{ed}^3} \cdot \sin^4[6\theta] + \overline{K_{ed}}\right) - \right. \quad (21)$$

$$\left. \Delta K_{eq} \cdot (-G) \cdot \left(\frac{\overline{\Delta K_{ed}}}{\Delta K_{eq}}\right)^2 \cdot \frac{\Delta K_{eq}}{K_{ed}} \right)$$

$$= \frac{3}{2} \cdot P_m \cdot \overline{I_q} \cdot \left(\left(-\frac{\overline{\Delta K_{ed}^4}}{K_{ed}^3} \cdot \sin^4[6\theta] + \overline{K_{ed}}\right) + \right.$$

$$\left. G \cdot \left(\frac{\overline{\Delta K_{ed}}}{\Delta K_{eq}}\right)^2 \cdot \frac{\Delta K_{eq}^2}{K_{ed}} \cdot \cos^2[6\theta]\right)$$

-continued $$= \frac{3}{2} \cdot P_m \cdot \overline{I_q} \cdot \left( -\frac{\overline{\Delta K_{ed}^4}}{K_{ed}^3} \cdot \sin^4[6\theta] - \frac{G}{2} \cdot \frac{\overline{\Delta K_{ed}^2}}{\overline{K_{ed}}} \cdot \cos[12\theta] + \frac{G}{2} \cdot \frac{\overline{\Delta K_{ed}^2}}{\overline{K_{ed}}} + \overline{K_{ed}} \right)$$

The relationship expressed in (19) allows expression (21) to be rewritten as expression (22) below.

$$\tau_m \approx \frac{3}{2} \cdot P_m \cdot \overline{I_q} \cdot \left( -\frac{G}{2} \cdot \frac{\overline{\Delta K_{ed}^2}}{\overline{K_{ed}}} \cdot \cos[12\theta] + \frac{G}{2} \cdot \frac{\overline{\Delta K_{ed}^2}}{\overline{K_{ed}}} + \overline{K_{ed}} \right) \quad (22)$$

By selecting an optimal value for the proportional gain G in expression (22), the DC torque component can be increased by an extent equivalent to ½ of the peak-to-peak wave height value (i.e., the amplitude) of the pulsating torque component in a twelfth-order harmonic. FIG. 9 shows torque characteristics that may be achieved by executing such torque ripple suppression compensation. Through this suppression compensation, the sixth-order harmonic component can be greatly reduced, as indicated in FIG. 9, compared to the sixth-order harmonic component in the characteristics in FIG. 8 observed when no suppression compensation is implemented. Furthermore, the DC torque component can be increased by an extent equivalent to ½ of the amplitude $\Delta\tau_{m12}$ in the twelfth-order harmonic pulsating torque component at the magnet motor 1. In other words, by adjusting the proportional gain G, the ripple component and the DC component in the torque ripple can be controlled as desired. This, in turn, enables effective utilization of the DC component in the torque ripple.

Second Embodiment

Figure 10:
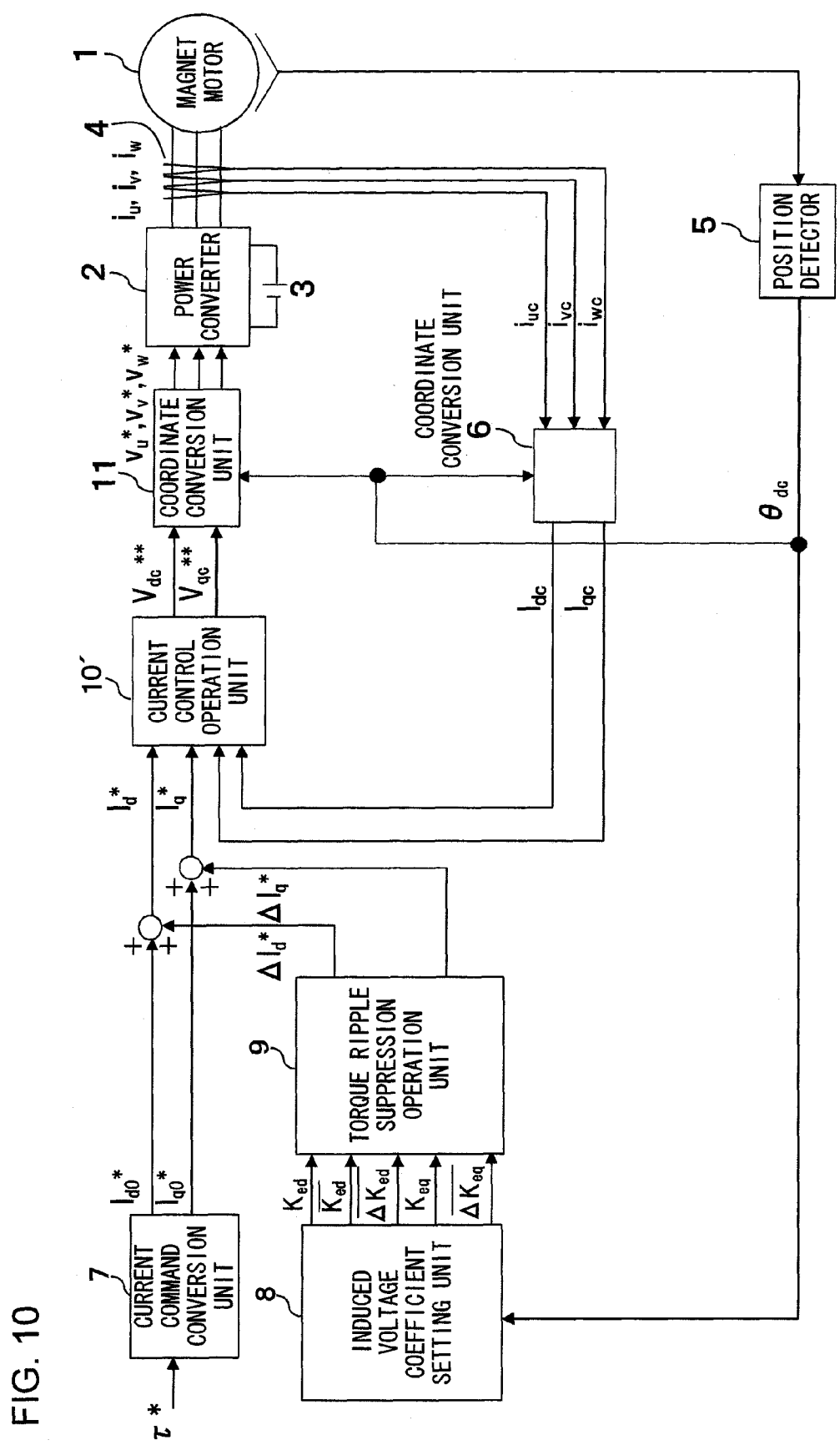
FIG. 10 is a block diagram showing the structure of a permanent magnet motor torque pulsation suppression control device achieved in a second embodiment of the present invention.

FIG. 10 presents an example of a structure that may be adopted in the permanent magnet motor torque ripple suppression control device in the second embodiment of the present invention. While the current control operation unit 10 adopts a proportional-integration operation method in the first embodiment described earlier, the current control operation unit in this embodiment has an added capability for pulsation disturbance current control operation with sensitivity to the frequency component of the torque ripple, as described below.

There is an issue yet to be addressed in the first embodiment shown in FIG. 1 in that when the individual control gains $K_{pd}$, $K_{id}$, $K_{pq}$ and $K_{iq}$ set as expressed in (3) by the current control operation unit 10 assume small values, the conformity of the current values to the current command values will be compromised in a high speed range. For instance, if an inexpensive microcomputer is used to constitute the current control operation unit 10, the control operation cycle will be set to an order of several milliseconds, which, in turn, will restrict the current control response frequency to approximately several tens of hertz.

Figure 11:
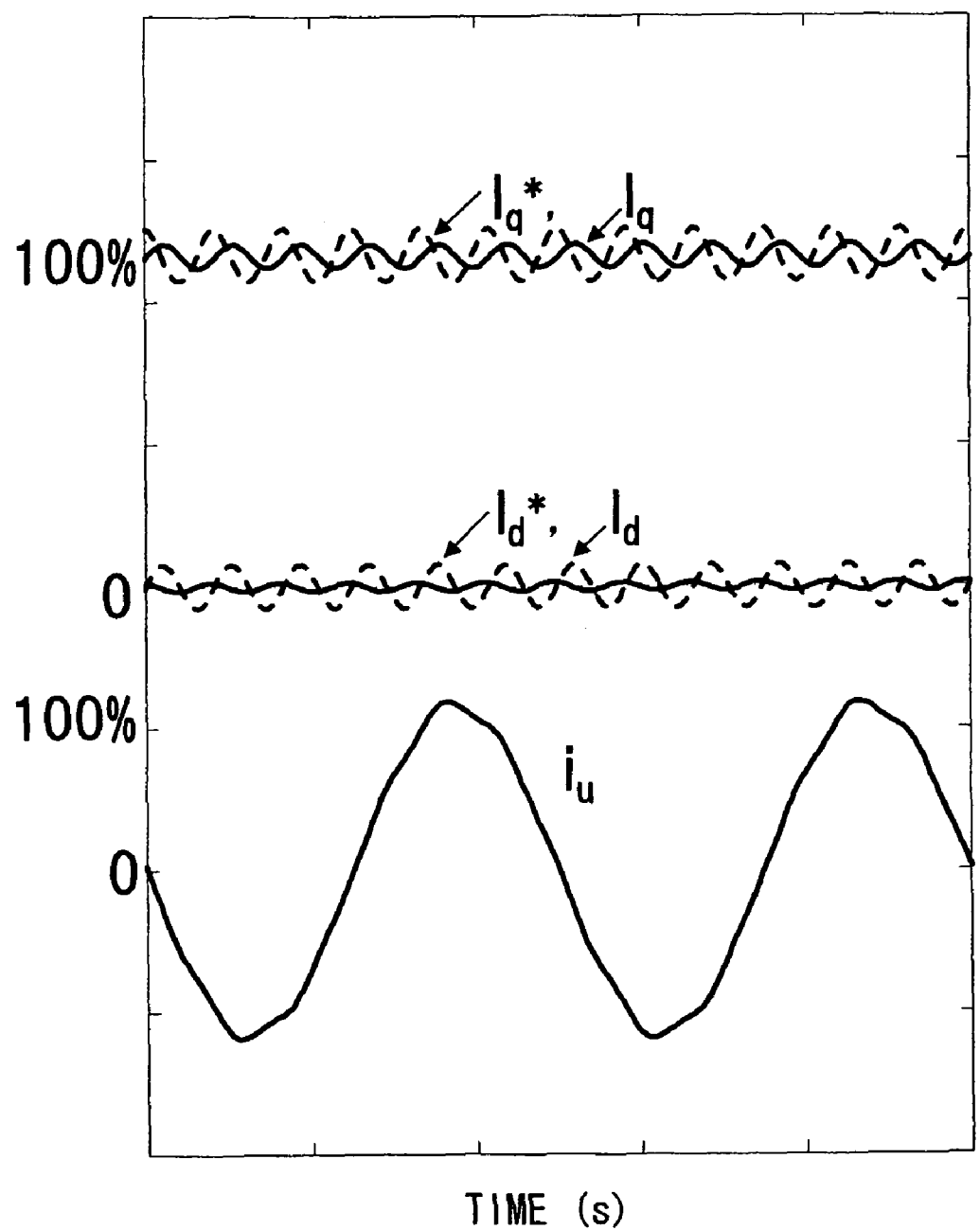
FIG. 11 shows current characteristics that may be observed in a high-speed range when no pulsation disturbance current control is executed.

FIG. 11 shows the operational waveforms of the d-axis and q-axis current information signals $I_d^*$, $I_{dc}$, $I_q^*$ and $I_{qc}$ and the u-phase alternating current $i_{uc}$ that may register when the rotation rate of the permanent magnet motor 1 is in a high range. FIG. 11 indicates that the current detection values $I_{dc}$ and $I_{qc}$ do not conform to the respective current command values $I_d^*$ and $I_q^*$ when the motor rotation rate is in the high range. Under these circumstances, the extent of torque ripple is bound to increase even if suppression compensation such as that described in reference to the first embodiment is implemented.

Accordingly, control that incorporates pulsation disturbance current control operation with sensitivity to the frequency component of the torque ripple is executed by the torque ripple suppression control device shown in FIG. 10 in the embodiment. This torque ripple suppression control device includes a current control operation unit 10' in place of the current control operation unit 10 shown in FIG. 1. It is to be noted that the other components of the torque ripple suppression control device are identical to those in FIG. 1.

The current control operation unit 10' executes another current control operation assuming sensitivity to the frequency component of the torque ripple, as well as the current control operation shown in FIG. 2. It then adds the output values resulting from the other current control operation to output values resulting from the current control operation shown in FIG. 2 and outputs the sums as a d-axis voltage command value $V_{dc}^{}$ and a q-axis voltage command value $V_{qc}^{}$.

Figure 12:
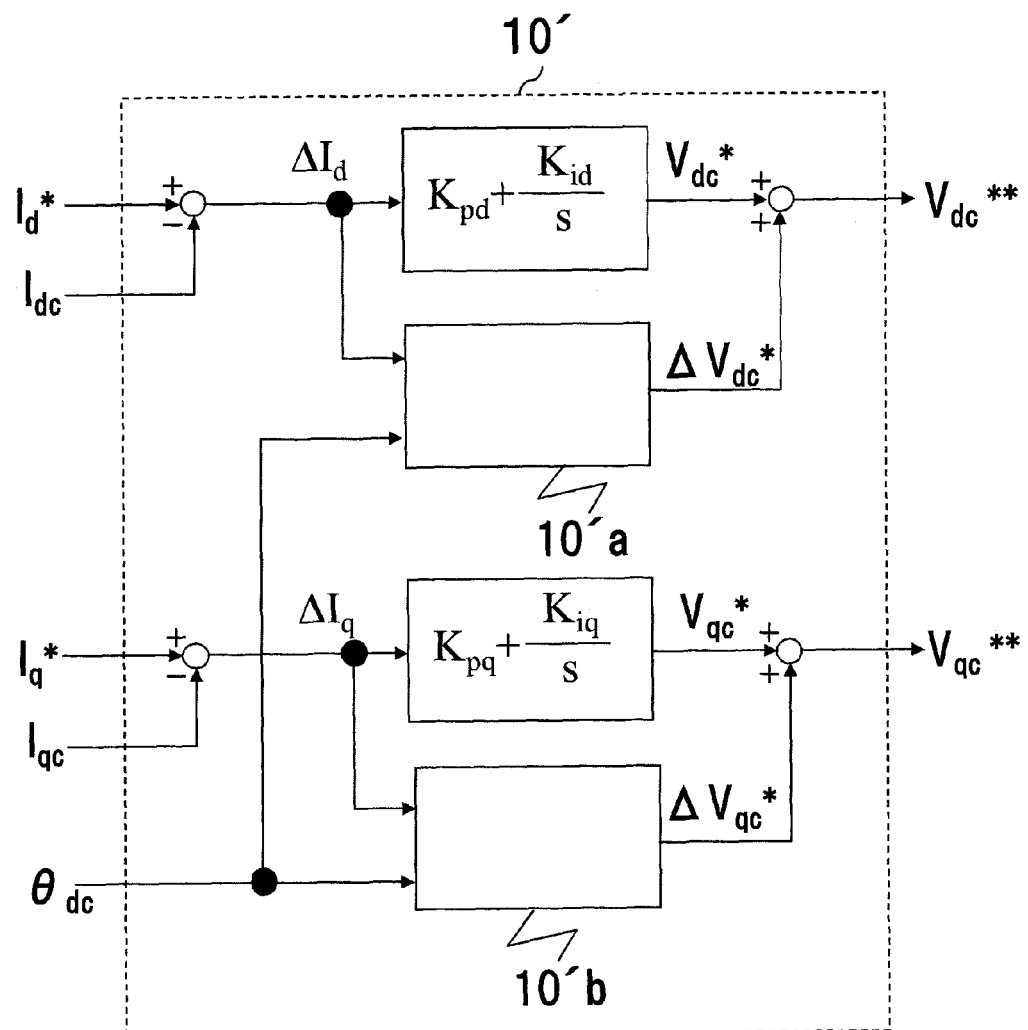
FIG. 12 shows the structure of a current control operation unit with an added capability for pulsation disturbance current control.

In reference to FIG. 12, the current control operation unit 10' is described in more specific detail. A d-axis pulsation disturbance current control operation unit 10'a in the current control operation unit 10' outputs a signal $\Delta V_{dc}^*$, generated based upon the d-axis current deviation $\Delta I_d (=I_d^* - I_{dc})$ input thereto, with which a component value matching the torque ripple frequency component is to be suppressed. In addition, a q-axis pulsation disturbance current control operation unit 10'b outputs a signal $\Delta V_{qc}^*$, generated based upon the q-axis current deviation $\Delta I_{qc} = (I_q^* - I_{qc})$ input thereto, with which a component value matching the torque ripple pulsation frequency component is to be suppressed. The current control operation unit 10' adds these signals $\Delta V_{dc}^*$ and $\Delta V_{qc}^*$ respectively to the d-axis voltage command value $V_{dc}^*$ and the q-axis voltage command value $V_{qc}^*$ and outputs the sums as a new d-axis voltage command value $V_{dc}^{}$ and a new q-axis voltage command value $V_{qc}^{}$.

Figure 13:
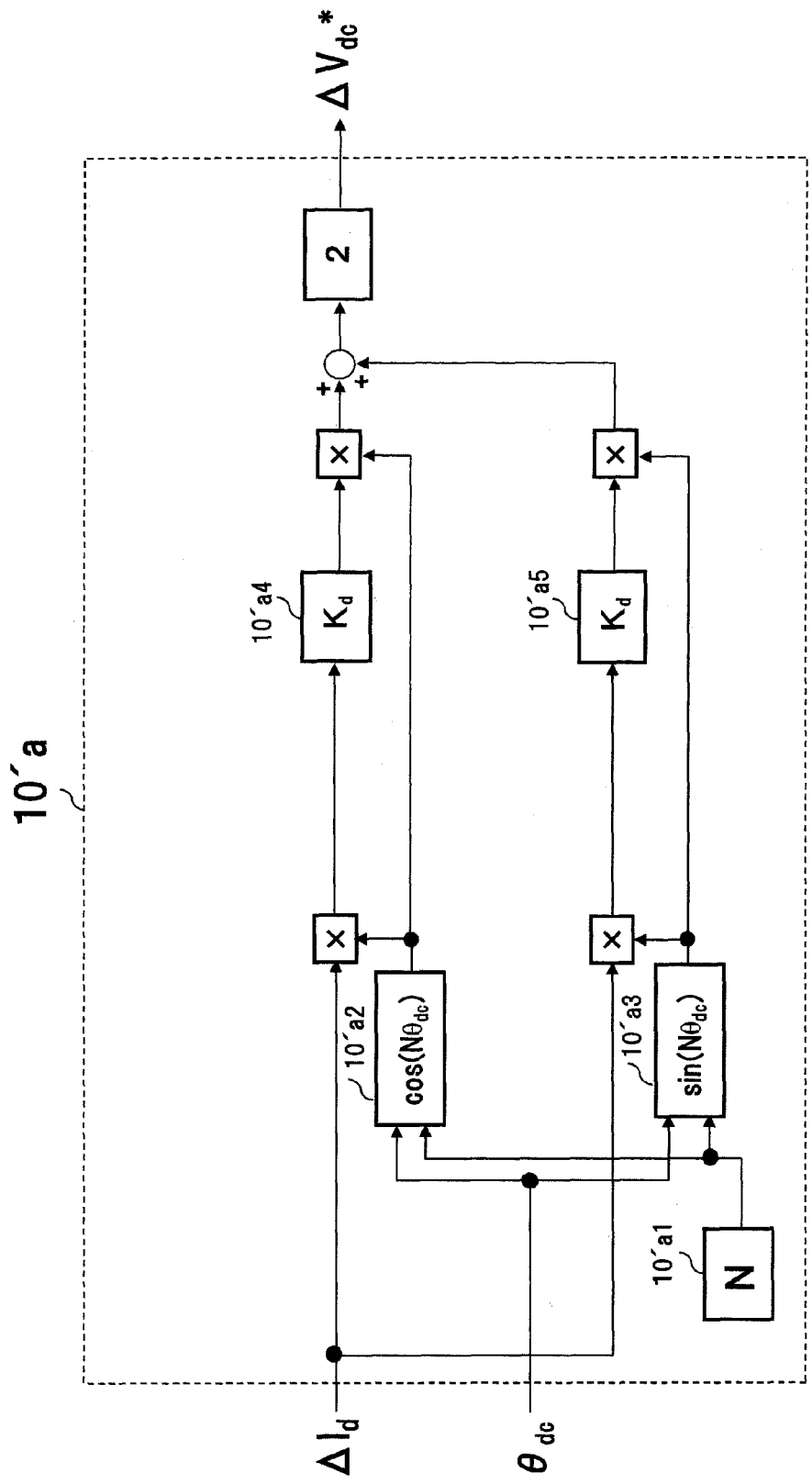
FIG. 13 shows the structure of the d-axis pulsation disturbance current control operation unit.

Next, in reference to FIG. 13, the structure of the d-axis pulsation disturbance current control operation unit 10'a is described. The position detection value $\theta_{dc}$ provided by the position detector 5 and a constant N provided by a constant generation unit 10'a1 are input to both a cosine signal generation unit 10'a2 and a sine signal generation unit 10'a3 at the d-axis pulsation disturbance current control operation unit 10'a. The cosine signal generation unit 10'a2 and the sine signal generation unit 10'a3 respectively output a cosine signal $\cos(N \cdot \theta_{dc})$ and a sine signal $\sin(N \cdot \theta_{dc})$ based upon the position detection value $\theta_{dc}$ and the constant N input thereto. These signals are then both multiplied by the d-axis current deviation $\Delta I_d$. Subsequently, the signals are further multiplied by a constant $K_d$ respectively at a constant multiplying unit 10'a4 and a constant multiplying unit 10'a5. The values obtained by multiplying the cosine signal $\cos(N \cdot \theta_{dc})$ by the d-axis current deviation $\Delta I_d$ and the constant $K_d$ and by multiplying the sine signal $\sin(N \cdot \theta_{dc})$ by the d-axis current deviation $\Delta I_d$ and the constant $K_d$ are respectively multiplied by the cosine signal $\cos(N \cdot \theta_{dc})$ and the sine signal $\sin(N \cdot \theta_{dc})$ again and then are added together. A value obtained by doubling the sum is output as the d-axis pulsation compensation value $\Delta V_{dc}^*$ from the d-axis pulsation disturbance current control operation unit 10'a.

Figure 14:
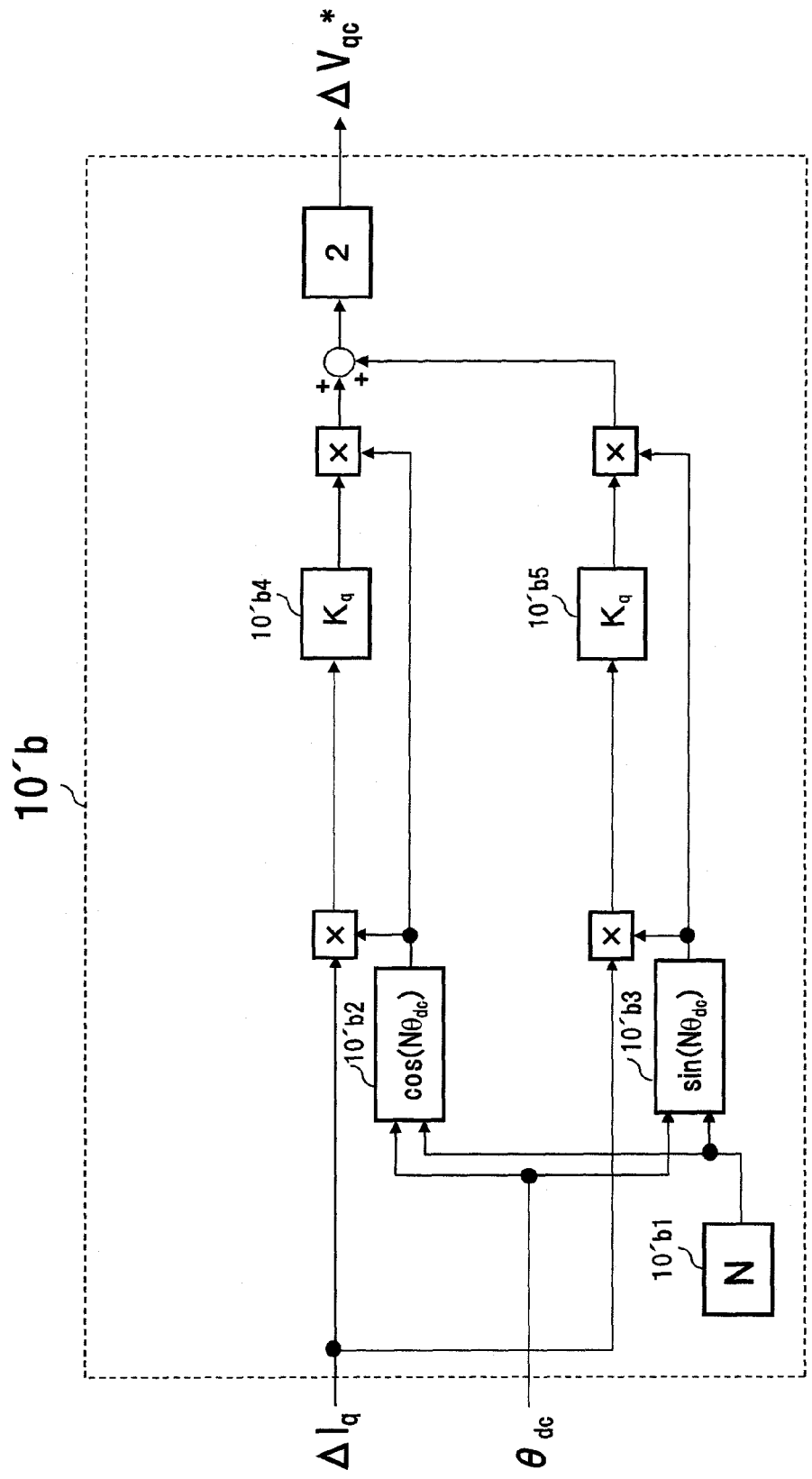
FIG. 14 shows the structure of the q-axis pulsation disturbance current control operation unit.

Next, in reference to FIG. 14, the structure of the q-axis pulsation disturbance current control operation unit 10'b is described. The position detection value $\theta_{dc}$ provided by the position detector 5 and a constant N provided by a constant generation unit 10′*b*1 are input to both a cosine signal generation unit 10′*b*2 and a sine signal generation unit 10′*b*3 at the q-axis pulsation disturbance current control operation unit 10′*b*. The cosine signal generation unit 10′*b*2 and the sine signal generation unit 10′*b*3 respectively output a cosine signal $\cos(N \cdot \theta_{dc})$ and a sine signal $\sin(N \cdot \theta_{dc})$ based upon the position detection value $\theta_{dc}$ and the constant N input thereto, in much the same way as that described in reference to FIG. 13. These signals are then both multiplied by the q-axis current deviation $\Delta I_q$. Subsequently, the signals are further multiplied by a constant $K_q$ respectively at a constant multiplying unit 10′*b*4 and a constant multiplying unit 10′*b*5. The values obtained by multiplying the cosine signal $\cos(N \cdot \theta_{dc})$ by the d-axis current deviation $\Delta I_q$ and the constant $K_d$ and by multiplying the sine signal $\sin(N \cdot \theta_{dc})$ by the q-axis current deviation $\Delta I_q$ and the constant $K_q$ are respectively multiplied by the cosine signal $\cos(N \cdot \theta_{dc})$ and the sine signal $\sin(N \cdot \theta_{dc})$ again and then are added together in much the same way as that described in reference to FIG. 13. A value obtained by doubling the sum is output as the q-axis pulsation compensation value $\Delta V_{qc}^*$ from the q-axis pulsation disturbance current control operation unit 10′*b*.

The principle of the operations executed by the pulsation disturbance current control operation units 10′*a* and 10′*b*, which characterizes the present invention, is now described. The following explanation focuses on the pulsation disturbance current control operation unit 10′*b* as a representative of the two operation units. As described earlier, the position detection value $\theta_{dc}$ and the constant N indicating the order of the torque pulsation frequency (the order of the largest harmonic component contained in a single cycle of the electric frequency) are both input to the cosine signal generation unit 10′*b*2 and the sine signal generation unit 10′*b*3 at the pulsation disturbance current control operation unit 10′*b*, as has been described earlier. Then, a cosine signal and a sine signal are respectively calculated by the cosine signal generation unit 10′*b*2 and the sine signal generation unit 10′*b*3, each based upon a product of the input values $(N \cdot \theta_{dc})$.

A harmonic component $\Delta I_{qrip}$ contained in the q-axis current detection value $I_{qc}$ is defined as expressed in (23) below.

$$\Delta I_{qrip} = |\Delta I_{qrip}| \cdot \sin(N \cdot \theta_{dc}) \tag{23}$$

$|\Delta I_{qrip}|$ in expression (23) represents the amplitude value of the Nth-order harmonic component.

$I_{a1}$ and $I_{b1}$ respectively representing the results obtained by multiplying the output signals from the cosine signal generation unit 10′*b*2 and the sine signal generation unit 10′*b*3 by the amplitude value $|\Delta I_{qrip}|$ of the harmonic component defined in expression (23) above, are expressed as in (24) below.

$$\begin{bmatrix} I_{a1} \\ I_{b1} \end{bmatrix} = |\Delta I_{qrip}| \cdot \sin(N \cdot \theta_{dc}) \cdot \begin{bmatrix} \cos(N \cdot \theta_{dc}) \\ \sin(N \cdot \theta_{dc}) \end{bmatrix} \tag{24}$$

$I_{a2}$ and $I_{b2}$ respectively representing the results obtained by multiplying the signals $I_{a1}$ and $I_{b1}$ in expression (24) by a predetermined proportional gain $K_q$ at the constant multiplying units 10′*b*4 and 10′*b*5 are expressed as in (25) below.

$$\begin{bmatrix} I_{a2} \\ I_{b2} \end{bmatrix} = K_q \cdot \begin{bmatrix} I_{a1} \\ I_{b1} \end{bmatrix} \cdot \begin{bmatrix} \cos(N \cdot \theta_{dc}) \\ \sin(N \cdot \theta_{dc}) \end{bmatrix} \tag{25}$$

$$= K_q \cdot |\Delta I_{qrip}| \cdot \sin(N \cdot \theta_{dc}) \cdot \begin{bmatrix} \cos(N \cdot \theta_{dc}) \\ \sin(N \cdot \theta_{dc}) \end{bmatrix}$$

Next, the q-axis pulsation compensation value $\Delta V_{qc}^*$ is calculated through operation executed as expressed in (26) below by using the signals $I_{a2}$ and $I_{b2}$ having been calculated as expressed in (25).

$$\begin{aligned} \Delta V_{qc}^* &= [I_{a2} \cdot \cos(N \cdot \theta_{dc}) + I_{b2} \cdot \sin(N \cdot \theta_{dc})] \\ &= K_q \cdot |\Delta I_{qrip}| \cdot \sin(N \cdot \theta_{dc}) \cdot \cos^2(N \cdot \theta_{dc}) + \\ &\quad K_q \cdot |\Delta I_{qrip}| \cdot \sin(N \cdot \theta_{dc}) \cdot \sin^2(N \cdot \theta_{dc}) \\ &= K_q \cdot |\Delta I_{qrip}| \cdot \sin(N \cdot \theta_{dc}) \end{aligned} \tag{26}$$

Expression (26) indicates that the voltage value can be corrected with the value obtained by multiplying the harmonic component $\Delta I_{qrip}$ by the gain $K_q$.

The d-axis pulsation compensation value $\Delta V_{dc}^*$ is calculated through similar operation executed in correspondence to the d-axis. These calculated values $\Delta V_{dc}^*$ and $\Delta V_{qc}^*$ are respectively added to the d-axis voltage command value $V_{dc}^*$ and the q-axis voltage command value $V_{qc}^*$ and the inverter output voltages are thus controlled. Through these measures, pulsation disturbance current control achieving sensitivity to the torque ripple frequency component N is enabled.

Figure 15:
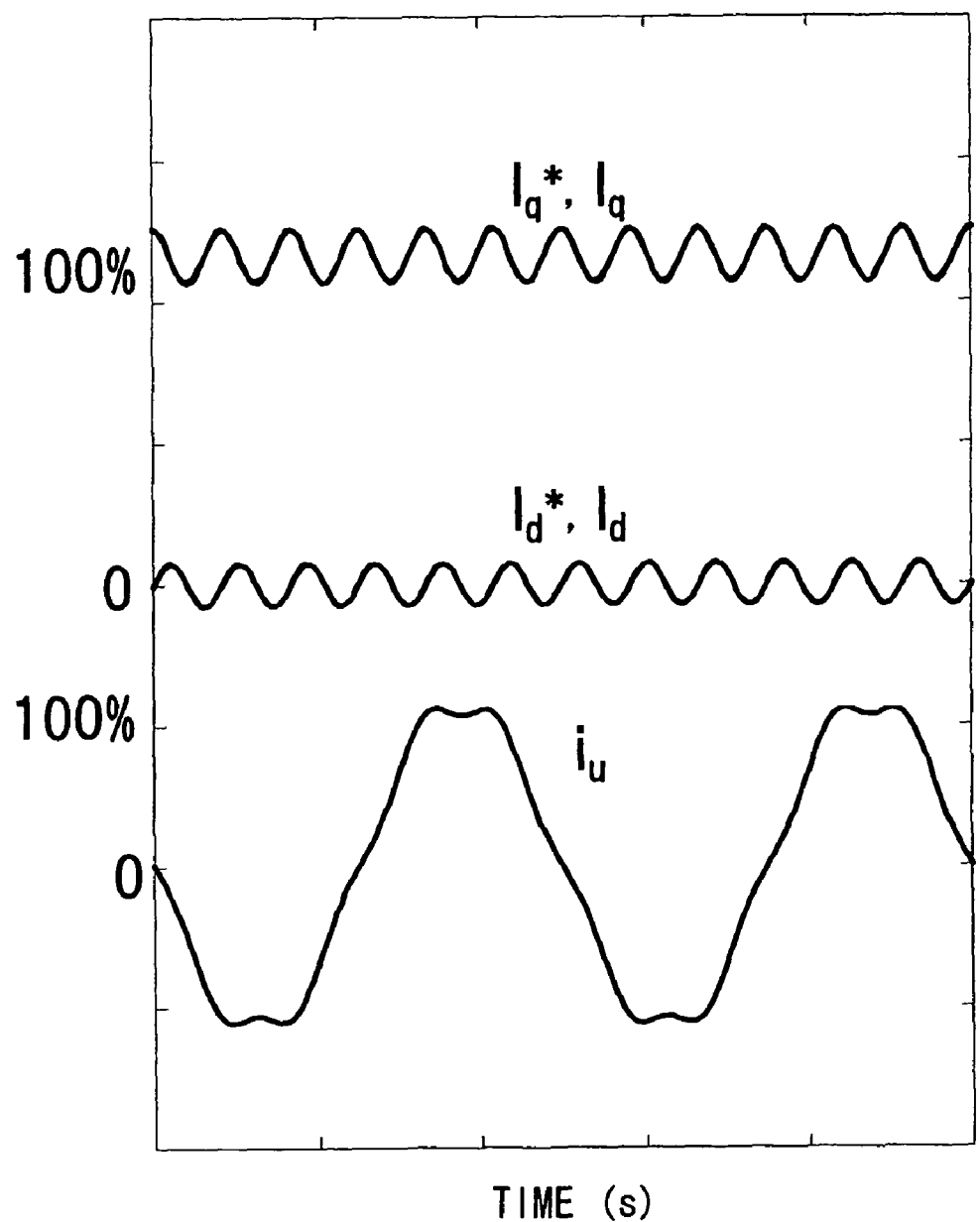
FIG. 15 shows current characteristics that may be observed in a high-speed range when pulsation disturbance current control is executed.

FIG. 15 shows the control characteristics achieved by adopting the present invention. The control characteristics indicate that by incorporating the torque ripple suppression compensation described above, current detection values $I_{dc}$ and $I_{qc}$ can be made to conform to the respective current command values $I_d^*$ and $I_q^*$ with a higher degree of precision, even in a high motor rotation rate range, in comparison to the control characteristics in FIG. 11, which are observed when no suppression compensation is implemented. In other words, the torque pulsation can be suppressed effectively in the high speed range.

It is to be noted that the current control operation unit 10′ in the second embodiment of the present invention described above may calculate only either the d-axis pulsation compensation value $\Delta V_{dc}^*$ or the q-axis pulsation compensation value $\Delta V_{qc}^*$. Namely, the current control operation unit does not need to include both the d-axis pulsation disturbance current control operation unit 10′*a* and the q-axis pulsation disturbance current control operation unit 10′*b*. In such a case, in correspondence to the d-axis or the q-axis, for which the pulsation compensation value is not calculated, the voltage command value $V_{dc}^*$ or $V_{qc}^*$ should be directly output from the current control operation unit 10′ to the coordinate conversion unit 11, as in the first embodiment.

Third Embodiment

Figure 16:
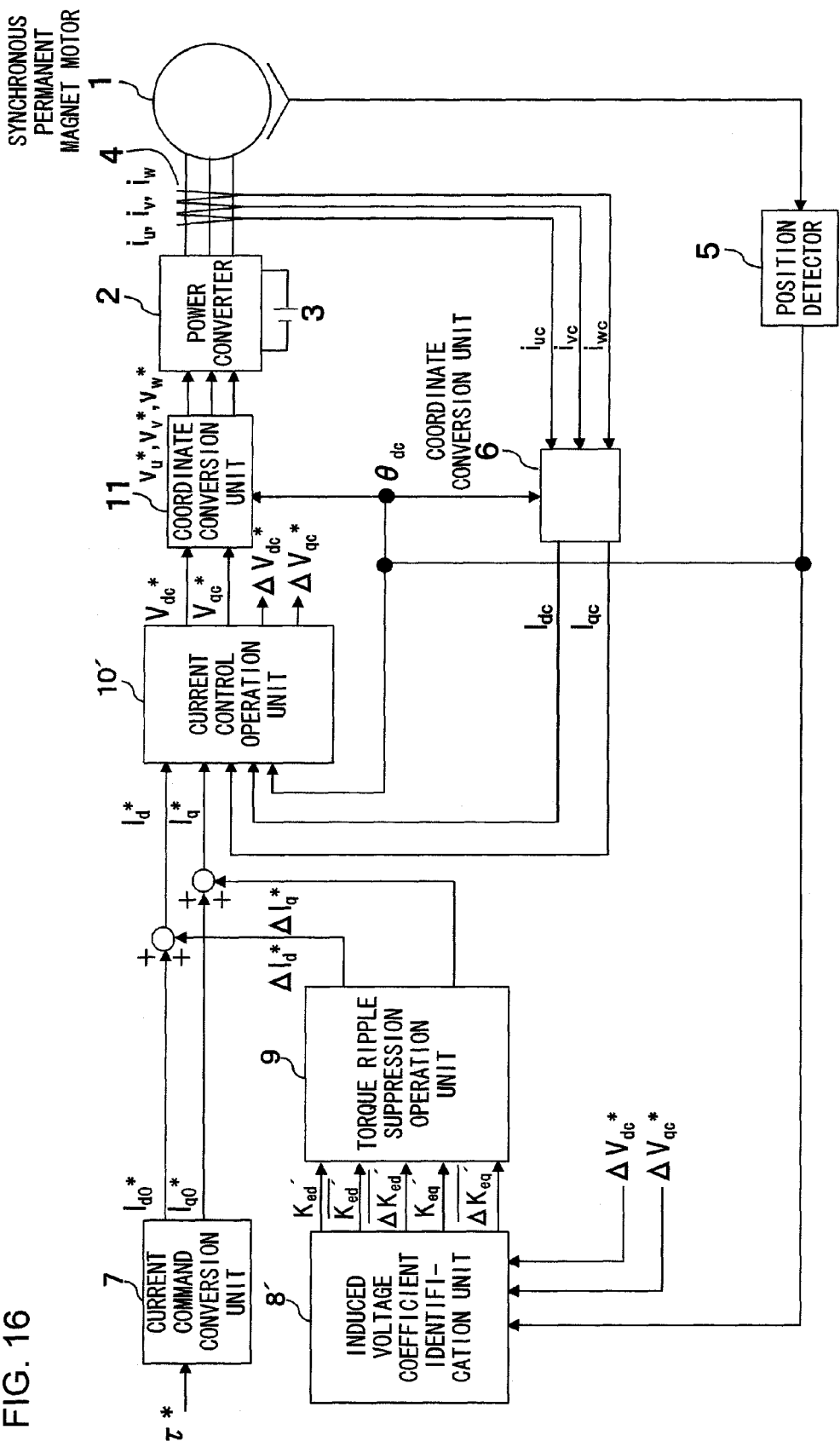
FIG. 16 is a block diagram showing the structure of a permanent magnet motor torque pulsation suppression control device achieved in a third embodiment of the present invention.

FIG. 16 presents an example of a structure that may be adopted in the permanent magnet motor torque ripple suppression control device in a third embodiment of the present invention. While the induced voltage coefficient information signals are output from the reference table 8*a* in the first and second embodiments described above, induced voltage coefficient information signals generated through estimating operation executed by using the output values resulting from the pulsation disturbance current control are utilized in the torque ripple suppression compensation operation in the embodiment described below.

The torque ripple suppression control device shown in FIG. 16 includes an induced voltage coefficient identification unit 8′ in place of the induced voltage setting unit 8 shown in FIGS. 1 and 10. It is to be noted that the other components of the torque ripple suppression control device are identical to those in FIG. 10.

The position detection value $\theta_{dc}$ provided by the position detector 5 and the output values $\Delta V_{dc}^*$ and $\Delta V_{qc}^*$ from the d-axis pulsation disturbance current control operation unit 10'a and the q-axis pulsation disturbance current control operation unit 10'b in the current control operation unit 10' having been described earlier in reference to the second embodiment are input to the induced voltage coefficient identification unit 8'. Based upon these input values, the induced voltage coefficient identification unit 8' outputs estimated values $K_{ed}'$, $^-K_{ed}'$, $^-K_{eq}'$ and $^-\Delta K_{eq}'$, estimated respectively in correspondence to the induced voltage coefficient information signals $K_{ed}$, $^-K_{ed}$, $^-\Delta K_{ed}$, $K_{eq}$ and $^-\Delta K_{eq}$ explained earlier in reference to the first embodiment.

Figure 17:
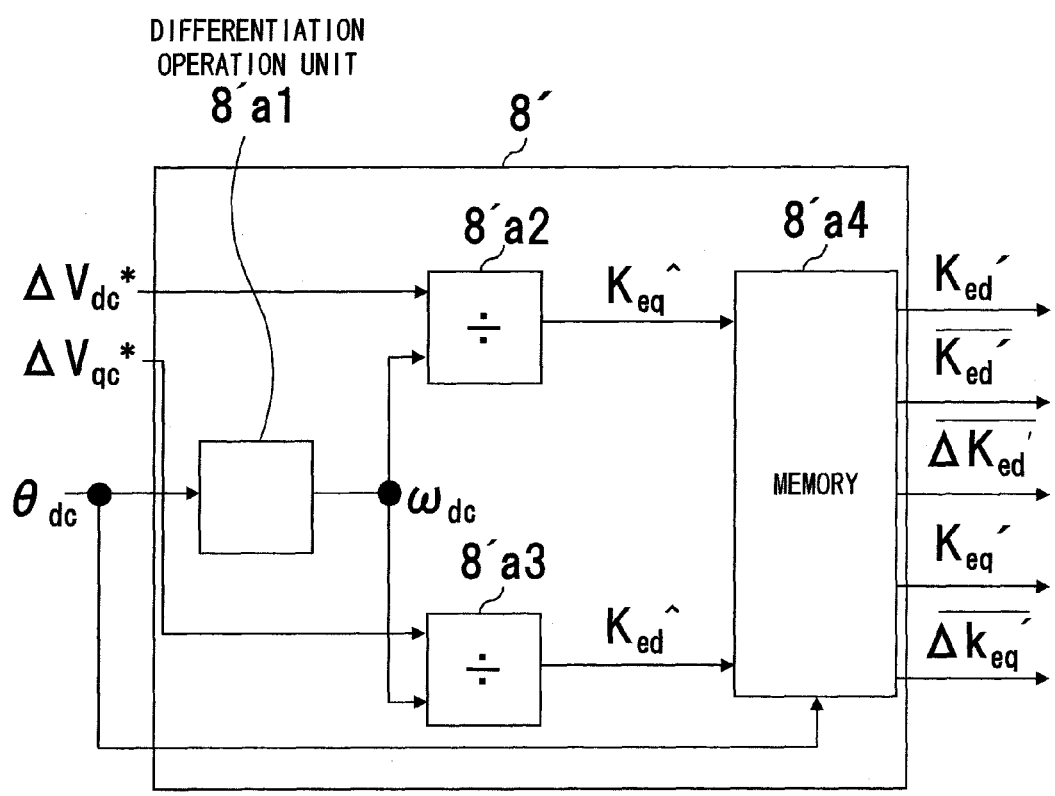
FIG. 17 presents an example of a structure that may be adopted in the induced voltage coefficient identification unit.

An example of a structure that may be adopted in the induced voltage coefficient identification unit 8' is presented in FIG. 17. As indicated in FIG. 17, the position detection signal $\theta_{dc}$ provided by the position detector 5 is input to a differentiation operation unit 8'a1. The differentiation operation unit 8'a1 executes operation expressed in (27) below and outputs a motor angular speed calculation value $\omega_{dc}$.

$$\omega_{dc} = \frac{d}{dt} \cdot \theta_{dc} \quad (27)$$

The signal $\omega_{dc}$ output from the differentiation operation unit 8'a1 as described above, is input to a dividing unit 8'a2 together with the output value $\Delta V_{dc}^*$ from the pulsation disturbance current control operation unit 10'a and input to a dividing unit 8'a3 together with the output value $\Delta V_{qc}^*$ from pulsation disturbance current control operation unit 10'b. The dividing units 8'a2 and 8'a3 calculate an estimated d-axis induced voltage coefficient value $K_{ed}^\wedge$ and an estimated q-axis induced voltage coefficient value $K_{eq}^\wedge$ through operation executed as expressed in (28) below based upon the signal $\omega_{dc}$ and the value $\Delta V_{dc}^*$ and based upon the signal $\omega_{dc}$ and the value $\Delta V_{qc}^*$ having been input.

$$\begin{bmatrix} K_{ed}^\wedge \\ K_{eq}^\wedge \end{bmatrix} = \frac{1}{\omega_{dc}} \begin{bmatrix} \Delta V_{dc}^* \\ \Delta V_{qc}^* \end{bmatrix} \quad (28)$$

The estimated values $K_{ed}^\wedge$ and $K_{eq}^\wedge$ having been calculated at the dividing units 8'a2 and 8'a3 are input to a memory unit 8'a4 together with the position detection signal $\theta_{dc}$. Based upon data related to the induced voltage coefficient information $K_{ed}$, $^-K_{ed}$, $^-\Delta K_{ed}$, $K_{eq}$ and $^-\Delta K_{eq}$, which are stored therein in advance, the memory unit 8'a4 outputs estimated values $K_{ed}'$, $^-K_{ea}'$, $^-\Delta K_{ed}'$, $K_{eq}'$ and $^-\Delta K_{eq}'$ corresponding to the signal $\theta_{dc}$ having been input.

It is to be noted that the data may be stored into the memory unit 8'a4 during a test operation of the device or while the device is adjusted. Furthermore, the data may be stored while the device is engaged in actual operation, instead. In any case, the data related to the induced voltage coefficient information should first be stored into the memory unit 8'a4 and the individual estimated values $K_{ed}'$, $^-K_{ed}'$, $^-\Delta K_{ed}'$, $K_{eq}'$ and $^-\Delta K_{eq}'$ should then be output in correspondence to the position detection value $\theta_{dc}$.

As an alternative, the induced voltage coefficient information signals may be extracted during actual operation and these signals may be output as estimated values $K_{ed}'$, $^-K_{ed}'$, $^-\Delta K_{ed}'$, $K_{eq}'$ and $^-\Delta K_{eq}'$ instead of storing in advance the data related to the induced voltage coefficient information $K_{ed}$, $^-K_{ed}$, $\Delta K_{ed}$, $K_{eq}$ and $^-\Delta K_{eq}$ as described above.

Figure 18:
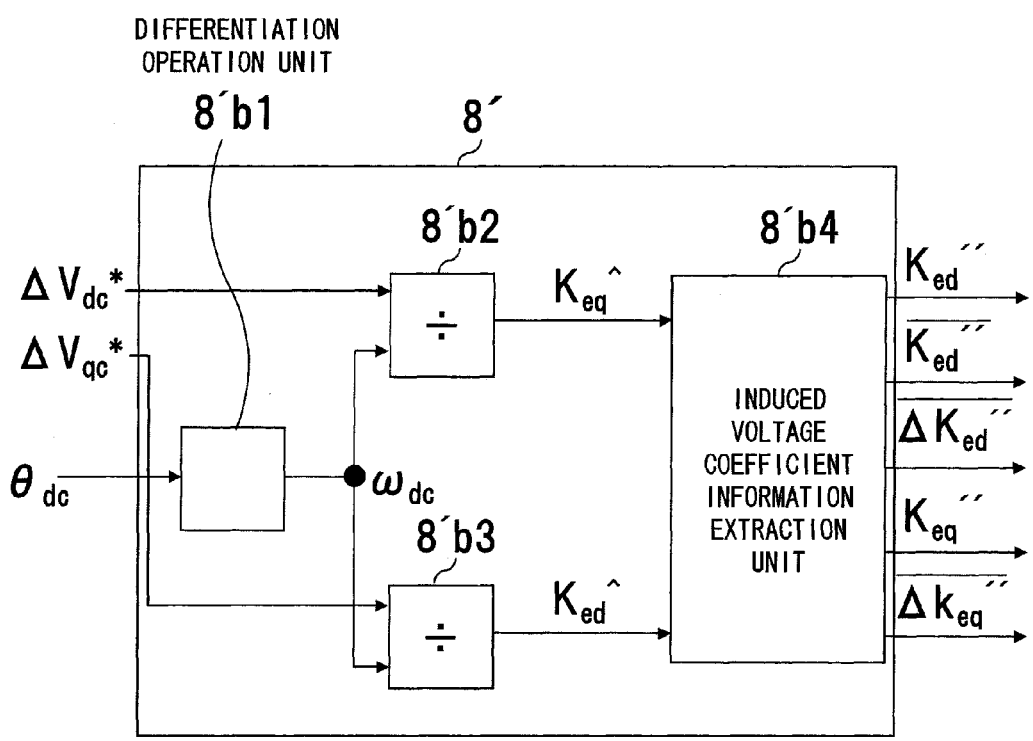
FIG. 18 presents another example of a structure that may be adopted in the induced voltage coefficient identification unit.

Such an alternative may be adopted in conjunction with an induced voltage coefficient identification unit 8' assuming a structure such as that shown in FIG. 18. FIG. 18 indicates that the position detection signal $\theta_{dc}$ provided by the position detector 5 is input to a differentiation operation unit 8'b1. As does the differentiation operation unit 8'a1 in FIG. 17, the differentiation operation unit 8'b1 outputs a motor angular speed calculation value $\omega_{dc}$ obtained through operation executed as expressed in (27). The signal $\omega_{dc}$ is input to a dividing unit 8'b2 together with the output value $\Delta V_{dc}^*$ from the pulsation disturbance current control operation unit 10'a and input to a dividing unit 8'b3 together with the output value $\Delta V_{qc}^*$ from pulsation disturbance current control operation unit 10'b. As do the dividing units 8'a2 and 8'a3 in FIG. 17, the dividing units 8'b2 and 8'b3 calculate an estimated d-axis induced voltage coefficient value $K_{ea}^\wedge$ and an estimated q-axis induced voltage coefficient value $K_{eq}^\wedge$ through operation executed as expressed in (28) based upon the signal $\omega_{dc}$ and the value $\Delta V_{dc}^*$ and based upon the signal $\omega_{dc}$ and the value $\Delta V_{qc}^*$ having been input.

The estimated values $K_{ed}^\wedge$ and $K_{eq}^\wedge$ having been calculated are input to an induced voltage coefficient information extraction unit 8'b4. Based upon these estimated values having been input thereto, the induced voltage coefficient information extraction unit 8'b4 calculates estimated values $K_{ed}'$, $^-K_{ed}'$, $^-K_{ed}'$, $K_{eq}'$ and $^-\Delta K_{eq}'$ corresponding to the various induced voltage coefficient information signals and outputs the estimated values having been calculated.

Figure 19:
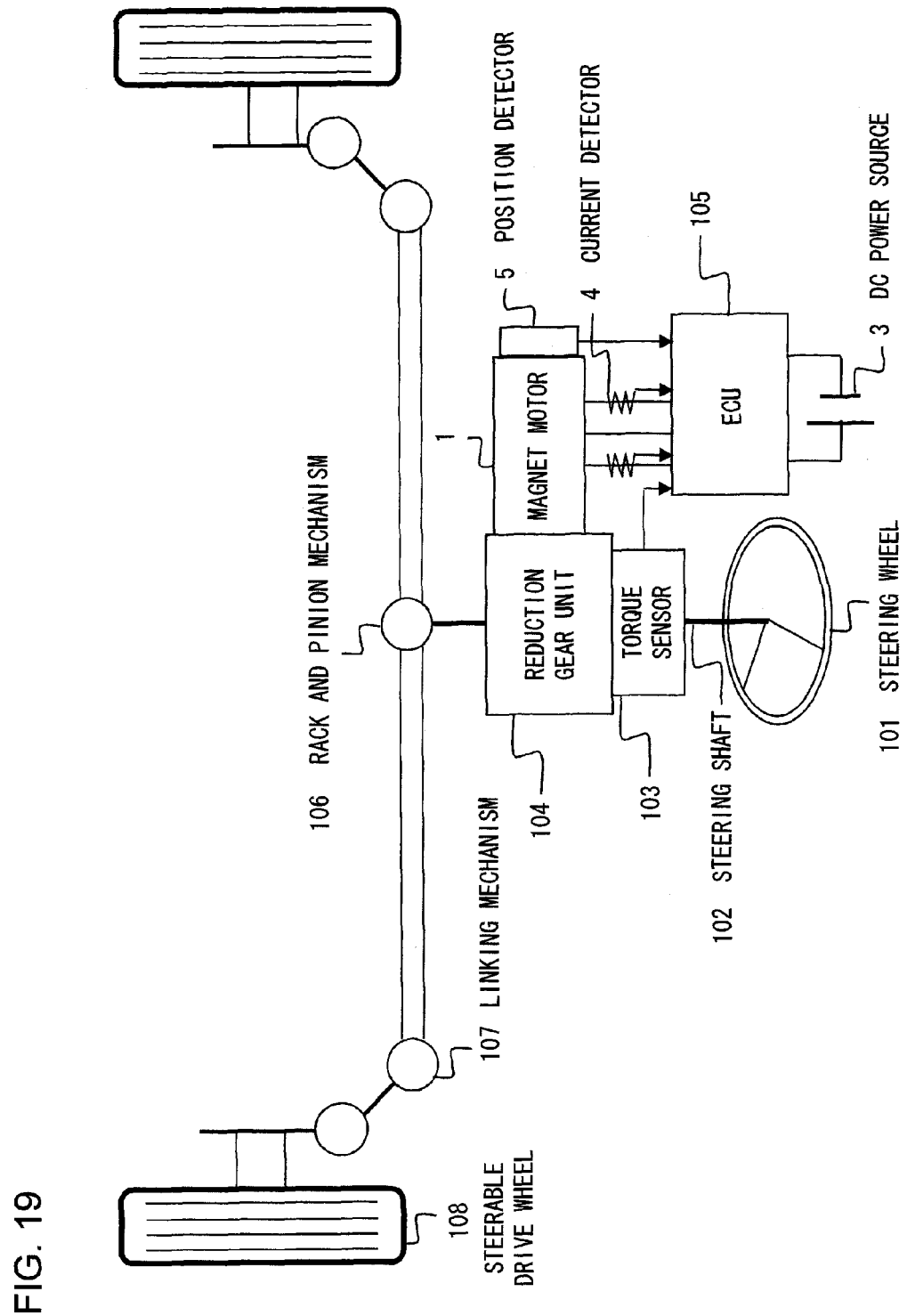
FIG. 19 presents an example of an application in which the present invention is adopted in an electric power steering system.

FIG. 19 presents an example of an application in which the permanent magnet motor torque ripple suppression control device achieved in any of the first through third embodiments described above is adopted in an electric power steering system. In FIG. 19, reference numeral 101 indicates a steering wheel, reference numeral 102 indicates a steering shaft mechanically connected to the steering wheel 101, reference numeral 103 indicates a torque sensor, reference numeral 104 indicates a reduction gear unit that mechanically connects the magnet motor 1 with the steering shaft 102, reference numeral 105 indicates an ECU (engine control unit), reference numeral 106 indicates a rack and pinion mechanism, reference numeral 107 indicates a linking mechanism such as a tie rod and reference numeral 108 indicates a steerable drive wheel. The permanent magnet motor torque ripple suppression control device in any of the first through third embodiments is mounted at the ECU 105. It is to be noted that the DC power source 3, the current detection unit 4 and the position detector 5 are identical to those in FIGS. 1, 10 and 16.

The torque sensor 103 detects a steering operation performed by the driver via the steering wheel 101. The ECU 105 includes a torque command unit that outputs a torque command value $\tau^*$ to the current command conversion unit 7 of the torque ripple suppression control device based upon steering operation detection results provided by the torque sensor 103. The torque ripple suppression control device controls the three-phase voltage command values so as to match the output torque with the torque command value provided by the torque command unit. The magnet motor 1 assists the steering operation performed by the driver via the steering wheel 101 as it applies an assisting force to the steering shaft 102 via the reduction gear unit 104.

The permanent magnet motor torque ripple suppression control device in the ECU 105 executes the torque ripple suppression control described earlier. As a result, high precision torque control is realized even if an inexpensive magnet motor 1 manifesting distortion in the induced voltages is used in the electric power steering system in FIG. 19. For instance, while the torque control may be executed by primarily focusing on torque ripple component suppression in a speed range over which the magnet motor 1 rotates at low speed, settings for assuring generation of a satisfactory level of DC component can be selected in a high speed range. Consequently, a sense of smooth-response steering can be created when, for instance, the driver turns the steering wheel 101 slowly. In addition, when the magnet motor 1 rotates at high speed, a higher output from the magnet motor 1 can be assured by ensuring that a substantial DC torque component is generated. The magnet motor 1 can thus be provided as a compact unit, as well.

—Variations—

In the embodiments described above, the vector control is executed by creating voltage command values $V_{dc}^*$ and $V_{qc}^*$ based upon the current command values $I_d^*$ and $I_q^*$ and the current detection values $I_{dc}$ and $I_{qc}$. However, the present invention is not limited to this example and may be adopted in the vector control executed by creating voltage correction values $\Delta V_d$ and $\Delta V_q$ based upon the current command values $I_d^*$ and $I_q^*$ and the current detection values $I_{dc}$ and $I_{qc}$ and calculating voltage command values $V_{dc}^*$ and $V_{qc}^*$ through operation executed as expressed in (29) below based upon the voltage correction values, the current command values $I_d^*$ and $I_q^*$, a calculated speed value $\omega_{cd}$ and a constant related to the magnet motor 1.

$$\begin{bmatrix} V_{dc}^{*\prime} \\ V_{qc}^{*\prime} \end{bmatrix} = \begin{bmatrix} R^* & -\omega_{cd} \cdot L^* \\ \omega_{cd} \cdot L^* & R^* \end{bmatrix} \cdot \begin{bmatrix} Id^* \\ Iq^* \end{bmatrix} + \begin{bmatrix} 0 \\ \omega_{cd} \cdot K_e^* \end{bmatrix} + \begin{bmatrix} \Delta V_d \\ \Delta V_q \end{bmatrix} \quad (29)$$

As an alternative, the present invention may be adopted in vector control executed as expressed in (30) below by using second current command values $I_d^{}$ and $I_q^{}$ created based upon the current command values $I_d^*$ and $I_q^*$ and the current detection values $I_{dc}$ and $I_{qc}$.

$$\begin{bmatrix} V_{dc}^{*\prime} \\ V_{qc}^{*\prime} \end{bmatrix} = \begin{bmatrix} R^* & -\omega_{cd} \cdot L^* \\ \omega_{cd} \cdot L^* & R^* \end{bmatrix} \cdot \begin{bmatrix} Id^{} \\ Iq^{} \end{bmatrix} + \begin{bmatrix} 0 \\ \omega_{cd} \cdot K_e^* \end{bmatrix} \quad (30)$$

As a further alternative, the present invention may be adopted in vector control executed as expressed in (31) or (32) below instead of (29) or (30) above, in which the vector control is executed by using an induced voltage coefficient $K_e^*$. This alternative makes it possible to reduce the onus placed on the current control operation unit 10 in FIG. 1 or the current control operation unit 10' in FIGS. 10 and 16, which will obviously improve the conformity to the current command values.

$$\begin{bmatrix} V_{dc}^{*\prime} \\ V_{qc}^{*\prime} \end{bmatrix} = \begin{bmatrix} R^* & -\omega_{cd} \cdot L^* \\ \omega_{cd} \cdot L^* & R^* \end{bmatrix} \cdot \begin{bmatrix} Id^* \\ Iq^* \end{bmatrix} + \begin{bmatrix} \omega_{cd} \cdot K_{eq} \\ \omega_{cd} \cdot K_{ed} \end{bmatrix} + \begin{bmatrix} \Delta V_d \\ \Delta V_q \end{bmatrix} \quad (31)$$

$$\begin{bmatrix} V_{dc}^{*\prime} \\ V_{qc}^{*\prime} \end{bmatrix} = \begin{bmatrix} R^* & -\omega_{cd} \cdot L^* \\ \omega_{cd} \cdot L^* & R^* \end{bmatrix} \cdot \begin{bmatrix} Id^{} \\ Iq^{} \end{bmatrix} + \begin{bmatrix} \omega_{cd} \cdot K_{eq} \\ \omega_{cd} \cdot K_{ed} \end{bmatrix} \quad (32)$$

It is to be noted that in expressions (31) and (32), the induced voltage coefficient information signals $K_{ed}$ and $K_{eq}$ that are set in advance as has been described in reference to the first embodiment are used. However, instead of these induced voltage coefficient information signals, the estimated values $K_{ed}'$ and $K_{eq}'$ for the induced voltage coefficient information described in reference to the third embodiment may be used.

In addition, while the AC currents $i_u$, $i_v$ and $i_w$ that are directly detected by the current detector 4 are used in the first through third embodiments, AC currents $i_u$, $i_v$ and $i_w$ may be replicated in correspondence to a DC current flowing through a one-shunt resistor installed for purposes of over-current detection at the power converter 2.

Furthermore, while the rotational position of the magnet motor 1 is detected by the position detector 5 constituted with an encoder, a resolver, a magnetic pole position sensor or the like in the first through third embodiments, the present invention may also be adopted in a device that executes motor control through a method employing no position sensor.

For instance, a phase error $\Delta\theta_c$ representing the deviation of the motor phase value relative a phase command value may be calculated through operation executed as expressed in (33) below based upon the voltage command values $V_{dc}^*$ and $V_{qc}^*$, the current detection values $I_{dc}$ and $I_{qc}$ and the motor constant.

$$\Delta\theta_c = \tan^{-1}\left[\frac{V_{dc}^* - R^* \cdot I_{dc} + \omega_{dc}' \cdot L_q^* \cdot I_{qc}}{V_{qc}^* - R^* \cdot I_{qc} - \omega_{dc}' \cdot L_q^* \cdot I_{dc}}\right] \quad (33)$$

Motor control can then be executed by controlling an estimated frequency value $\omega_{dc}'$ so as to reduce the signal $\Delta\theta_c$ calculated as expressed in (33) to 0. In this manner, the present invention can also be adopted effectively in conjunction with a control method employing no position sensor.

It is to be noted that any of the embodiments described above may be adopted in combination with one of, or a plurality of the variations. In addition, the variations may be adopted in any conceivable combination.

The embodiments described above and the variations thereof are simply provided as examples and components other than those in the embodiments may be used as long as the features characterizing the present invention are not compromised.

What is claimed is:

1. A torque ripple suppression control device for a permanent magnet motor, comprising:
    a current command conversion unit that outputs a current command value based upon a torque command value input thereto from an external source;
    a position detector that outputs a position detection value by detecting a rotational position of the permanent magnet motor;
    a current detection unit that outputs a current detection value by detecting a current at the permanent magnet motor;
    an induced voltage coefficient setting unit that outputs, based upon the position detection value, an information signal related to an induced voltage coefficient for an induced voltage at the permanent magnet motor;
    a torque ripple suppression operation unit that outputs, based upon the information signal and a preset proportional gain, a current correction command value for the permanent magnet motor;
    a current control operation unit that outputs, based upon addition results obtained by adding together the current command value and the current correction command value and the current detection value, a voltage command value based upon which the permanent magnet motor is to be driven; and a power converter that outputs, based upon the voltage command value, a voltage with which the permanent magnet motor is to be driven.

2. A torque ripple suppression control device for a permanent magnet motor according to claim 1, wherein:

the current command conversion unit outputs a d-axis current command value and a q-axis current command value corresponding to a d-axis and a q-axis of a rotation coordinate system of the permanent magnet motor;

the induced voltage coefficient setting unit outputs information signals related to a d-axis induced voltage coefficient and a q-axis induced voltage coefficient corresponding to the d-axis and the q-axis;

the torque ripple suppression operation unit outputs a d-axis current correction command value and a q-axis current correction command value corresponding to the d-axis and the q-axis; and the current control operation unit outputs a d-axis voltage command value and a q-axis voltage command value corresponding to the d-axis and the q-axis based upon addition results obtained by adding together the d-axis current command value and the d-axis current correction command value, addition results obtained by adding together the q-axis current command value and the q-axis current correction command value, and the current detection value.

3. A torque ripple suppression control device for a permanent magnet motor according to claim 2, wherein:

the induced voltage coefficient setting unit outputs information signals related to the d-axis induced voltage coefficient and the q-axis induced voltage coefficient based upon the position detection value, the d-axis voltage command value and the q-axis voltage command value.

4. A torque ripple suppression control device for a permanent magnet motor according to claim 2, further comprising:

a coordinate conversion unit that converts the d-axis voltage command value and the q-axis voltage command value to three-phase voltage command values in a stator coordinate system of the permanent magnet motor, wherein:

the power converter outputs the voltage based upon the three-phase voltage command values.

5. A torque ripple suppression control device for a permanent magnet motor according to claim 2, wherein:

the induced voltage coefficient setting unit outputs, as the information signals, an induced voltage coefficient average value and a pulsation component amplitude value corresponding to at least either the d-axis or the q-axis in addition to the d-axis induced voltage coefficient and the q-axis induced voltage coefficient.

6. A torque ripple suppression control device for a permanent magnet motor according to claim 5, wherein:

the d-axis induced voltage coefficient and the q-axis induced voltage coefficient each change in correspondence to the position detection value whereas the average value and the pulsation component amplitude value both remain constant, unaffected by the position detection value.

7. A torque ripple suppression control device for a permanent magnet motor according to claim 5, wherein:

the torque ripple suppression operation unit outputs the q-axis current correction command value based upon a pulsation component in the d-axis induced voltage coefficient and the induced voltage coefficient average value corresponding to the d-axis.

8. A torque ripple suppression control device for a permanent magnet motor according to claim 7, wherein:

the torque ripple suppression operation unit outputs the q-axis current correction command value $\Delta I_q^*$ based upon an expression below:

$$\Delta I_q^* = \sum_{n=1}^{\infty} \left(-\frac{\Delta K_{ed}}{\overline{K_{ed}}}\right)^n \cdot \overline{I_q},$$

with n, $\Delta K_{ed}$, $\overline{K_{ed}}$ and $\overline{I_q}$ in the expression respectively representing an integer, the pulsation component in the d-axis induced voltage coefficient, the induced voltage coefficient average value corresponding to the d-axis and a current average value corresponding to the q-axis.

9. A torque ripple suppression control device for a permanent magnet motor according to claim 5, wherein:

the torque ripple suppression operation unit outputs the q-axis current correction command value based upon the proportional gain, pulsation component amplitude values in the d-axis induced voltage coefficient and the q-axis induced voltage coefficient, a pulsation component in the q-axis induced voltage coefficient and the induced voltage coefficient average value corresponding to the d-axis.

10. A torque ripple suppression control device for a permanent magnet motor according to claim 9, wherein:

the torque ripple suppression operation unit outputs the d-axis current correction command value $\Delta I_d^*$ based upon an expression below:

$$\Delta I_d^* = -G \cdot \left(\frac{\overline{\Delta K_{ed}}}{\overline{\Delta K_{eq}}}\right)^2 \cdot \frac{\Delta K_{eq}}{\overline{K_{ed}}} \cdot \overline{I_q},$$

with G, $\overline{\Delta K_{ed}}$, $\overline{\Delta K_{eq}}$, $\Delta K_{eq}$, $\overline{K_{ed}}$ and $\overline{I_q}$ in the expression respectively representing the proportional gain, the pulsation component amplitude value in the d-axis induced voltage coefficient, the pulsation component amplitude value in the q-axis induced voltage coefficient, the pulsation component in the q-axis induced voltage coefficient, the induced voltage coefficient average value corresponding to the d-axis and a current average value corresponding to the q-axis.

11. A torque ripple suppression control device for a permanent magnet motor according to claim 1, wherein:

the current control operation unit includes a pulsation disturbance current control operation unit that outputs a pulsation compensation value obtained based upon the position detection value and a value representing an order of a pulsation frequency in the torque at the permanent magnet motor; and the current control operation unit adds the pulsation compensation value to a first voltage command value, which is calculated based upon the current detection value and a sum of the current command value and the current correction command value, and outputs addition results as the voltage command value.

12. A torque ripple suppression control device for a permanent magnet motor according to claim 11, wherein:

the pulsation disturbance current control operation unit comprises:

a sine signal generation unit that generates a sine signal based upon the position detection value and the value representing the order of the pulsation frequency;

a cosine signal generation unit that generates a cosine signal based upon the position detection value and the value representing the order of the pulsation frequency;

a sine operation unit that determines a first operation value by multiplying the sine signal by a current deviation representing a difference between the current command value and the current detection value, by multiplying initial multiplication results by a constant and by further multiplying second multiplication results by the sine signal; and a cosine operation unit that determines a second operation value by multiplying the cosine signal by the current deviation, by multiplying initial multiplication results by the constant and by further multiplying second multiplication results by the cosine signal; and the pulsation disturbance current control operation unit outputs, as the pulsation compensation value, a value obtained by doubling a value representing a sum of the first operation value and the second operation value.

13. A torque ripple suppression control device for a permanent magnet motor according to claim 12, wherein:

the sine signal generation unit and the cosine signal generation unit respectively output a sine value and a cosine value corresponding to a value obtained by multiplying the position detection value by the value representing the order of the pulsation frequency as the sine signal and the cosine signal.

14. A torque ripple suppression control device for a permanent magnet motor according to claim 11, wherein:

the pulsation disturbance current control operation unit outputs the pulsation compensation value in correspondence to at least either the d-axis or the q-axis in the rotation coordinate system of the permanent magnet motor; and the current control operation unit outputs, as the voltage command value, a sum of the first voltage command value and the pulsation compensation value in correspondence to an axis for which the pulsation compensation value has been output by the pulsation disturbance current control operation unit and outputs, as the voltage command value, the first voltage command value in correspondence to an axis for which the pulsation compensation value has not been output by the pulsation disturbance current control operation unit.

15. A torque ripple suppression control device for a permanent magnet motor according to claim 11, wherein:

the pulsation disturbance current control operation unit outputs a d-axis pulsation compensation value and a q-axis pulsation compensation value in correspondence to a d-axis and a q-axis of a rotation coordinate system of the permanent magnet motor; and the induced voltage coefficient setting unit outputs information signals related to a d-axis induced voltage coefficient and a q-axis induced voltage coefficient corresponding to the d-axis and the q-axis based upon the position detection value, the d-axis pulsation compensation value and the q-axis pulsation compensation value.

16. A torque ripple suppression control device for a permanent magnet motor according to claim 1, wherein:

the power converter increases a DC torque in the permanent magnet motor by an extent equivalent to substantially half of an amplitude of a pulsating torque component in a twelfth-order harmonic in the permanent magnet motor, relative to a DC torque generated by driving the permanent magnet motor based upon a voltage command value output from the current control operation unit without adding the current correction command value to the current command value.

17. An electric power steering system, comprising:

a torque ripple suppression control device for a permanent magnet motor according to claim 1;

the permanent magnet motor;

a steering shaft mechanically connected to the permanent magnet motor via a reduction gear unit;

a steering wheel mechanically connected to the steering shaft;

a torque sensor that detects an operation input via the steering wheel; and a torque command unit that outputs the torque command value based upon operation detection results provided by the torque sensor.

* * * * *